US011082324B2

(12) United States Patent
Ramanathan et al.

(10) Patent No.: US 11,082,324 B2
(45) Date of Patent: Aug. 3, 2021

(54) VINE: ZERO-CONTROL ROUTING USING DATA PACKET INSPECTION FOR WIRELESS MESH NETWORKS

(71) Applicant: goTenna, Inc., Brooklyn, NY (US)

(72) Inventors: Subramanian Ramanathan, Westford, MA (US); Christophe Servaes, Guttenberg, NJ (US); Seth Foster, Brooklyn, NY (US)

(73) Assignee: goTenna Inc., Brooklyn, NY (US)

( * ) Notice: Subject to any disclaimer, the term of this patent is extended or adjusted under 35 U.S.C. 154(b) by 37 days.

(21) Appl. No.: 16/523,757

(22) Filed: Jul. 26, 2019

(65) Prior Publication Data

US 2020/0052997 A1    Feb. 13, 2020

Related U.S. Application Data

(60) Provisional application No. 62/711,274, filed on Jul. 27, 2018.

(51) Int. Cl.
| | |
|---|---|
| *H04L 12/751* | (2013.01) |
| *H04L 12/733* | (2013.01) |
| *H04L 12/841* | (2013.01) |
| *H04L 12/801* | (2013.01) |
| *H04L 29/06* | (2006.01) |
| *H04W 4/06* | (2009.01) |
| *H04W 84/18* | (2009.01) |

(52) U.S. Cl.
CPC ............ *H04L 45/02* (2013.01); *H04L 45/20* (2013.01); *H04L 47/286* (2013.01); *H04L 47/34* (2013.01); *H04L 69/22* (2013.01); *H04W 4/06* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2005/0226195 A1* | 10/2005 | Paris | H04L 43/18 370/338 |
| 2005/0249215 A1* | 11/2005 | Kelsey | H04L 45/34 370/392 |
| 2007/0286139 A1* | 12/2007 | Niu | H04L 45/26 370/338 |
| 2008/0075010 A1* | 3/2008 | Song | H04W 40/02 370/238 |

(Continued)

*Primary Examiner* — Jamaal Henson
(74) *Attorney, Agent, or Firm* — Hoffberg & Associates; Steven M. Hoffberg

(57) ABSTRACT

A MANET protocol, comprising: receiving a data packet (DP) from a current sender (CS) by a recipient, defining: an identity of the CS, a prior sender (PS) from which CS received DP, and a target recipient (ID), a count (HC) of hops previously traversed by DP, and a sequence identifier (SI); updating a forwarding table (FT) to mark CS as being reachable in one hop, and PS as being reachable in two hops via CS as next hop; determining if ID is the recipient; determining whether to rebroadcast by recipient, if and only if the SI is not present in a list of prior SIs; and selectively rebroadcasting DP by recipient in dependence on said determining, modified by: replacement of CS with an identity of the recipient, PS with CS, and ID with a next hop from the FT if present, and incrementing HC.

27 Claims, 3 Drawing Sheets

(56) References Cited

U.S. PATENT DOCUMENTS

| | | | | |
|---|---|---|---|---|
| 2008/0075029 | A1* | 3/2008 | Song | H04L 45/123 370/311 |
| 2010/0157889 | A1* | 6/2010 | Aggarwal | H04L 45/48 370/328 |
| 2010/0265955 | A1* | 10/2010 | Park | H04L 45/00 370/400 |
| 2012/0039235 | A1* | 2/2012 | Chen | H04L 12/189 370/312 |
| 2015/0341874 | A1* | 11/2015 | Nguyen-Dang | H04W 52/0209 370/350 |
| 2016/0088424 | A1* | 3/2016 | Polo | H04W 4/80 455/41.1 |
| 2016/0112929 | A1* | 4/2016 | Das | H04W 40/06 370/315 |

* cited by examiner

VINE: ZERO-CONTROL ROUTING USING DATA PACKET INSPECTION FOR WIRELESS MESH NETWORKS

CROSS REFERENCE TO RELATED APPLICATIONS

The present application is a non-provisional of, and claims benefit of priority from U.S. Provisional Patent Application No. 62/711,274, filed Jul. 27, 2018, the entirety of which is expressly incorporated herein by reference.

FIELD OF THE INVENTION

The present invention relates to the field of mobile ad hoc network communication protocols.

BACKGROUND OF THE INVENTION

All references cited herein are expressly incorporated by reference in their entirety.

A mesh network, see en.wikipedia.org/wiki/Mesh_Network is a local network in which the infrastructure (i.e. bridges, switches and other infrastructure devices) connect directly, dynamically and non-hierarchically to other nodes and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs. See, Akyildliz, I. F., Wang, X., & Wang, W. (2005). Wireless mesh networks: a survey. *Computer networks*, 47(4), 445-487.

A mobile mesh network is a mesh network in which the nodes can be mobile. A mobile mesh network is also referred to as a mobile ad hoc network (MANET). In such a network, the protocol does not presume persistence of the routing architecture, and therefore multihop routes require a mechanism for route discovery for communication of a message from a message-generating source node to a destination node. Such a procedure, often referred to as "routing" in the MANET/Mesh literature, is typically done by choosing a set of relaying nodes from the source to the destination, which could be the set of all nodes or a subset thereof, depending upon the solution.

A typical mesh network protocol strategy is to broadcast packets, which are then responded to by neighboring nodes. This, however, imposes particular inefficiencies. Even where these inefficiencies were sought to be minimized, packet transmission is typically nevertheless included in the protocol. See, Corson, M. Scott, and Anthony Ephremides. "A distributed routing algorithm for mobile wireless networks." Wireless networks 1, no. 1 (1995): 61-81. doi.org/10.1007/BF01196259), which explicitly mentions that it exchanges short messages to build routes.

Ad hoc networks or mesh network protocols have been studied. These protocols permit peer-to-peer communications between devices over a variety of frequency bands, and a range of capabilities. In a multihop network, communications are passed from one node to another in series between the source and destination. Because of various risks, as the number of hops grows, the reliability of a communication successfully reaching its destination tends to decrease, such that hop counts of more than 10 or 20 in a mobility permissive network are rarely considered feasible. A typical mesh network protocol maintains a routing table at each node, which is then used to control the communication. This routing table may be established proactively or reactively. In proactive routing, the network state information is pushed to the various nodes, often appended to other communications, such that when a communication is to be established, the nodes rely on the then-current routing information to control the communication. This paradigm suffers from the possibility of stale or incorrect routing information or overly burdensome administrative overhead, or both. Reactive routing seeks to determine the network state at the time of, and for the purpose of, a single set of communications, and therefore may require significant communications possibly far exceeding the amount of data to be communicated in order to establish a link. Because the network state is requested at the time of communication, there is less opportunity to piggyback the administrative information on other communications. There are also various hybrid ad hoc network routing protocols, which seek to compromise between these two strategies, and other paradigms as well.

Abolhasan, M., Wysocki, T. & Dutkiewicz, E. (2004). A review of routing protocols for mobile ad hoc networks. Ad Hoc Networks, 2 (1), 1-22, discusses various ad hoc networking protocols. Wired networks used two main algorithms; the link-state algorithm and the distance vector algorithm. In link-state routing, each node maintains an up-to-date view of the network by periodically broadcasting the link-state costs of its neighboring nodes to all other nodes using a flooding strategy. When each node receives an update packet, it updates its view of the network and the link-state information by applying a shortest-path algorithm to choose the next hop node for each destination. In distance-vector routing, for every destination x, each node i maintains a set of distances $Dx_{ij}$ where j ranges over the neighbors of node i. Node i selects a neighbor, k, to be the next hop for x if $Dx_{ik}=\min_j\{Dx_{ij}\}$. This allows each node to select the shortest path to each destination. The distance-vector information is updated at each node by a periodical dissemination of the current estimate of the shortest distance to every node [31].

The traditional link-state and distance-vector algorithm do not scale in large MANETs. This is because periodic or frequent route updates in large networks may consume significant part of the available bandwidth, increase channel contention and may require each node to frequently recharge their power supply. Where the network changes rapidly, or bandwidth is low, the routing information may prove inaccurate or stale.

To overcome the problems associated with the link-state and distance-vector algorithms a number of routing protocols have been proposed for MANETs. These protocols can be classified into three different groups: global/proactive, on-demand/reactive, and hybrid. In proactive routing protocols, the routes to all the destination (or parts of the network) are determined at the start up (before a need for communication), and maintained by using a periodic route update process.

In reactive protocols, routes are determined when they are required by the source using a route discovery process. Hybrid routing protocols combine the basic properties of the first two classes of protocols into one. That is, they are both reactive and proactive in nature. Each group has a number of different routing strategies, which employ a flat or a hierarchical routing structure.

1. Proactive Routing Protocols

In proactive routing protocols, each node maintains routing information to every other node (or nodes located in a specific part) in the network. The routing information is usually kept in a number of different tables. These tables are periodically updated and/or if the network topology changes. The difference between these protocols exist in the way the routing information is updated, detected and the type of information kept at each routing table. Furthermore, each routing protocol may maintain different number of tables.

1.1. Destination-Sequenced Distance Vector (DSDV)

The DSDV algorithm [27] is a modification of DBF [3, 10], which guarantees loop free routes. It provides a single path to a destination, which is selected using the distance vector shortest path routing algorithm. In order to reduce the amount of overhead transmitted through the network, two types of update packets are used. These are referred to as a "full dump" and "incremental" packets. The full dump packet carries all the available routing information and the incremental packet carries only the information changed since the last full dump. The incremental update messages are sent more frequently than the full dump packets. However, DSDV still introduces large amounts of overhead to the network due to the requirement of the periodic update messages, and the overhead grows according to $O(N^2)$. Therefore, the protocol will not scale in large network since a large portion of the network bandwidth is used in the updating procedures.

1.2. Wireless Routing Protocol (WRP)

The WRP protocol [22] also guarantees freedom from loops, and it avoids temporary routing loops by using the predecessor information. However, WRP requires each node to maintain four routing tables. This introduces a significant amount of memory overhead at each node as the size of the network increases. Another disadvantage of WRP is that it ensures connectivity through the use of "hello" messages. These hello messages are exchanged between neighboring nodes whenever there an absence of recent packet transmission. This will also consume a significant amount of bandwidth and power as each node is required to stay active at all times (i.e., they cannot enter sleep mode to conserve their power).

1.3. Global State Routing (GSR)

The GSR protocol [5] is based on the traditional Link State algorithm. However, GSR improves the way information is disseminated per the Link State algorithm by restricting the update messages between intermediate nodes only. In GSR, each node maintains a link state table based on the up-to-date information received from neighboring nodes, and periodically exchanges its link state information with neighboring nodes only. This significantly reduces the number of control message transmitted through the network. However, the size of update messages is relatively large, and as the size of the network grows they will get even larger. Therefore, a considerable amount of bandwidth is consumed by these update messages.

1.4. Fisheye State Routing (FSR)

The FSR protocol [12] is the descendent of GSR. FSR reduces the size of the update messages in GSR by updating the network information for nearby nodes at a higher frequency than for the remote nodes, which lie outside the fisheye scope. This makes FSR more scalable to large networks than the protocols described above. However, scalability comes at the price of reduced accuracy. This is because as mobility increases, the routes to remote destinations become less accurate. This can be overcome by making the frequency at which updates are sent to remote destinations proportional to the level of mobility. However, communication of mobility information increases the information communication overhead, and requires detection or determination of movement or other network configuration changes.

1.5. Source-Tree Adaptive Routing (STAR)

The STAR protocol [11] is also based on the link state algorithm. Each router maintains a source tree, which is a set of links containing the preferred paths to destinations. This protocol significantly reduces the amount of routing overhead disseminated into the network by using a least overhead routing approach (LORA), to exchange routing information. It also supports an optimum routing approach (ORA) if required. This approach eliminates the periodic updating procedure present in the Link State algorithm by making update dissemination conditional. As a result, the Link State updates are exchanged only when certain events occur. Therefore, STAR will scale well in large network since it has significantly reduced the bandwidth consumption for the routing updates, while at the same time reduces latency by using predetermined routes. However, this protocol may have significant memory and processing overheads in large and highly mobile networks, because each node is required to maintain a partial topology graph of the network (it is determined from the source tree reported by its neighbors), which may change frequently as the neighbors keep reporting different source trees. Further, if the correlated contingencies occur across the network, a global network failure may occur requiring a full link state communication to recover.

1.6. Distance Routing Effect Algorithm for Mobility (DREAM)

The DREAM routing protocol [2] employs a different approach to routing when compared to the prior discussed routing protocols. In DREAM, each node knows its geographical coordinates through GPS. These coordinates are periodically exchanged between each node and stored in a routing table (called a location table). The advantage of exchanging location information is that it consumes significantly less bandwidth than exchanging complete link state or distance vector information, which means that it is more scalable. In DREAM, routing overhead is further reduced, by making the frequency at which update messages are disseminated proportional to mobility and the distance effect. This means that stationary nodes do not need to send any update messages. The reliability of DREAM is dependent on communications cost and reliability being correlated with geographic distance, or that a map be available for translating geographic location into communications proximity.

1.7. Multimedia Support in Mobile Wireless Networks (MMWN)

In MMWN routing protocol [20] the network is maintained using a clustering hierarchy. Each cluster has two types of mobile nodes: switches and endpoints. Each cluster also has location manager (LM), which performs the location management for each cluster. All information in MMWN is stored in a dynamically distributed database. The advantage of MMWN is that only LMs perform location updating and location finding, which means that routing overhead is significantly reduced when compared to the traditional table driven algorithms (such as DSDV and WRP). However, location management is closely related to the hierarchical structure of the network, making the location finding and updating very complex. This is because in the location finding and updating process, messages have to travel through the hierarchical tree of the LMs. The changes in the hierarchical cluster membership of LMs will also affect the hierarchical management tree and introduce a complex consistency management. This feature introduces implementation problems, which are difficult to overcome [26].

1.8. Clusterhead Gateway Switch Routing (CGSR)

CGSR [6] is another hierarchical routing protocol where the nodes are grouped into cluster. However, the addressing scheme used is simpler than MMWN. In CGSR, there is no need to maintain a cluster hierarchy (which is required in MMWN). Instead, each cluster is maintained with a clusterhead, which is a mobile node elected to manage all the other nodes within the cluster (see FIG. 2). This node controls the transmission medium and all inter-cluster communications occur through this node. The advantage of this protocol is that each node only maintains routes to its clusterhead, which means that routing overheads are lower compared to flooding routing information through all the network. However, there are significant overheads associated with maintaining clusters. This is because each node needs to periodically broadcast its cluster member table and update its table based on the received updates.

1.9 Hierarchical State Routing (HSR)

HSR [26] is also based on the traditional Link State algorithm. However, unlike the other link state based algorithms described above, HSR maintains a hierarchical addressing and topology map. A clustering algorithm such as CGSR can be used to organize the nodes with close proximity into clusters. Each cluster has three types of nodes: a clusterhead node which acts as a local coordinator for each node, Gateway nodes which are nodes that lie in two different clusters, and internal nodes that are all the other nodes in each cluster. All nodes have a unique ID, which is typically the MAC address for each node. The nodes within each cluster broadcast their link information to each other. In HSR, each node also has a hierarchical ID (HID), which is a sequence of the MAC addresses from the top hierarchy to the source node. The HID can be used to send a packet from any source to any destination in the network. For example, a packet sent from a node in one cluster to a node in another cluster traverses the local hierarchy to its "top" node, is communicated to the corresponding "top" node of the other hierarchy, and then to the destination node, along a "virtual link".

Logical clustering provides a logical relationship between the clusterhead at a higher level. Here, the nodes are assigned logical address of the form <subnet,host>. The logical nodes are connected via logical links, which form a "tunnel" between lower level clusters. Logical nodes exchange logical link information as well as a summary information of the lower level clusters. The logical link state information is then flooded down to the lower levels. The physical nodes at the lowest level will then have a "hierarchical" topology of the network. The advantage of HSR over other hierarchical routing protocols (such as MMWN) is the separation of mobility management from the physical hierarchy. This is done via Home Agents. This protocol also has far less control overhead when compared to GSR and FSR. However, this protocol (similar to any other cluster based protocol) introduces extra overheads to the network from cluster formation and maintenance.

1.10 Optimized Link State Routing (OLSR)

OLSR [16] is a point-to-point routing protocol based on the traditional link-state algorithm. In this strategy, each node maintains topology information about the network by periodically exchanging link-state messages. OLSR minimizes the size of each control message and the number of rebroadcasting nodes during each route update by employing multipoint replaying (MPR) strategy. During each topology update, each node in the network selects a set of neighboring nodes to retransmit its packets. This set of nodes is called the multipoint relays of that node. Any node which is not in the set can read and process each packet but do not retransmit. To select the MPRs, each node periodically broadcasts a list of its one hop neighbors using "hello" messages. From the list of nodes in the hello messages, each node selects a subset of one hop neighbors, which covers all of its two hop neighbors. These MPR nodes cover all the nodes which are two hops away. Each node determines an optimal route (in terms of hops) to every known destination using its topology information (from the topology table and neighboring table), and stores this information in a routing table. Therefore, routes to every destination are immediately available when data transmission begins.

1.11 Topology Broadcast Reverse Path Forwarding (TBRPF)

TBRPF [4] is another link-state based routing protocol, which performs hop-by-hop routing. The protocol uses reverse-path forwarding (RPF) to disseminate its update packets in the reverse direction along the spanning tree, which is made up of the minimum-hop path from the nodes leading to the source of the update message. Each node calculates a source tree, which provides a path to all reachable destinations, by applying a modified version of Dijkstra's algorithm on the partial topology information stored in their topology table. In TBRPF, each node minimizes overhead by reporting only part of their source tree to their neighbors. The reportable part of each source tree is exchanged with neighboring nodes by periodic and differential "hello" messages. The differential hello messages only report the changes of the status of the neighboring nodes. As a result, the hello messages in TBRPF are smaller than in protocols which report the complete link-state information.

1.12 Landmark Ad Hoc Routing Protocol

Landmark Ad Hoc Routing Protocol (LANMAR) [35, 37, 39] is designed for an ad hoc network that exhibits group mobility. Namely, one can identify logical subnets in which the members have a commonality of interests and are likely to move as a group (e.g., a brigade or tank battalion in the battlefield). LANMAR uses an IP-like address consisting of a group ID (or subnet ID) and a host ID: <GroupID, HostID>. LANMAR uses the notion of landmarks to keep track of such logical groups. Each logical group has one dynamically elected node serving as a landmark. A global distance vector mechanism (e.g., DSDV [38]) propagates the routing information about all the landmarks in the entire network. Furthermore, LANMAR works in symbiosis with a local scope routing scheme. The local routing scheme can use the flat proactive protocols mentioned previously (e.g., FSR). FSR maintains detailed routing information for nodes within a given scope D (i.e., FSR updates propagate only up to hop distance D). As a result, each node has detailed topology information about nodes within its local scope and has a distance and routing vector to all landmarks. When a node needs to relay a packet to a destination within its scope, it uses the FSR routing tables directly. Otherwise, the packet will be routed toward the landmark corresponding to the destination's logical subnet, which is read from the logical address carried in the packet header. When the packet arrives within the scope of the destination, it is routed using local tables (that contain the destination), possibly without going through the landmark. LANMAR reduces both routing table size and control overhead effectively through the truncated local routing table and "summarized" routing information for remote groups of nodes. In general, by adopting different local routing schemes [36], LANMAR provides a flexible routing framework for scalable routing while still preserving the benefits introduced by the associated local scope routing scheme.

1.13 Summary of Proactive Routing

Most flat routed global routing protocols do not scale very well. This is because their updating procedure consumes a significant amount of network bandwidth. Of the flat routed protocols, OLSR may scale the best. This increase in scalability is achieved by reducing the number of rebroadcasting nodes through the use of multipoint relaying, which elects only a number of neighboring nodes to rebroadcast the message. This has the advantage of reducing, channel contention and the number of control packet travelling through the network when compared to strategies which use blind or pure flooding where all nodes rebroadcast the messages. The DREAM routing protocol also has scalability potential since it has significantly reduced the amount of overhead transmitted through the network, by exchanging location information rather than complete (or partial) link state information. The hierarchically routed global routing protocols will scale better than most of the flat routed protocols, since they have introduced a structure to the network, which control the amount of overhead transmitted through the network. This is done by allowing only selected nodes such as a clusterhead to rebroadcast control information. The common disadvantage associated with all the hierarchical protocols is mobility management. Mobility management introduces unnecessary overhead to the network (such as extra processing overheads for cluster formation and maintenance).

2. Reactive Routing Protocols

On-demand routing protocols were designed to reduce the overheads in proactive protocols by maintaining information for active routes only. This means that routes are determined and maintained for nodes that are required to send data to a particular destination. Route discovery usually occurs by flooding a route request packets through the network. When a node with a route to the destination (or the destination itself) is reached, a route reply is sent back to the source node using link reversal, if the route request has travelled through bi-directional links or by piggy-backing the route in a route reply packet via flooding. Therefore, the route discovery overhead (in the worst case scenario) will grow by $O(N+M)$ when link reversal is possible and $O(2N)$ for uni-directional links.

Reactive protocols can be classified into two categories: source routing and hop-by-hop routing. In Source routed on-demand protocols [19] and [33], each data packet carries the complete source to destination address. Therefore, each intermediate node forwards these packets according to the information kept in the header of each packet. This means that the intermediate nodes do not need to maintain up-to-date routing information for each active route in order to forward the packet towards the destination. Furthermore, nodes do not need to maintain neighbor connectivity through periodic beaconing messages. The major drawback with source routing protocols is that in large networks they do not perform well. This is due to two main reasons: first, as the number of intermediate nodes in each route grows, then so does the probability of route failure. Second, as the number of intermediate nodes in each route grows, then the amount of overhead carried in each header of each data packet grows as well. Therefore, in large networks with significant levels of multihoping and high levels of mobility, these protocols may not scale well.

In hop-by-hop routing (also known as point-to-point routing) [8], each data packet only carries the destination address and the next hop address. Therefore, each intermediate node in the path to the destination uses its routing table to forward each data packet towards the destination. The advantage of this strategy is that routes are adaptable to the dynamically changing environment of MANETs, since each node can update its routing table when they receiver fresher topology information and hence forward the data packets over fresher and better routes. Using fresher routes also means that fewer route recalculations are required during data transmission. The disadvantage of this strategy is that each intermediate node must store and maintain routing information for each active route and each node may be required to be aware of their surrounding neighbors through the use of beaconing messages.

A number of different reactive routing protocols have been proposed to increase the performance of reactive routing.

2.1. Ad Hoc on-Demand Distance Vector (AODV)

The AODV [8] routing protocol is based on the DSDV and DSR [19] algorithms. It uses the periodic beaconing and sequence numbering procedure of DSDV and a similar route discovery procedure as in DSR. However, there are two major differences between DSR and AODV. The most distinguishing difference is that in DSR, each packet carries full routing information, whereas in AODV the packets carry the destination address. This means that AODV has potentially less routing overheads than DSR. The other difference is that the route replies in DSR carry the address of every node along the route, whereas in AODV the route replies only carry the destination IP address and the sequence number. The advantage of AODV is that it is adaptable to highly dynamic networks. However, a node may experience large delays during route construction, and link failure may initiate another route discovery, which introduces extra delays and consumes more bandwidth as the size of the network increases.

2.2. Dynamic Source Routing (DSR)

The DSR protocol requires each packet to carry the full address (every hop in the route), from source to the destination. This means that the protocol will not be very effective in large networks, as the amount of overhead carried in the packet will continue to increase as the network diameter increases. In highly dynamic and large networks, the overhead may consume most of the bandwidth. This protocol has a number of advantages over routing protocols such as AODV, LMR [7] and TORA [25], and in small to moderately size networks (perhaps up to a few hundred nodes), this protocol may perform better. An advantage of DSR is that nodes can store multiple routes in their route cache, which means that the source node can check its route cache for a valid route before initiating route discovery, and if a valid route is found there is no need for route discovery. This is beneficial in networks with low mobility, since the routes stored in the route cache will be valid longer. Another advantage of DSR is that it does not require any periodic beaconing (or hello message exchanges), therefore nodes can enter sleep node to conserve their power. This also saves a considerable amount of bandwidth in the network.

2.3. Routing on-Demand Acyclic Multi-Path (ROAM)

The ROAM [29] routing protocol uses internodal coordination along directed acyclic subgraphs, which is derived from the routers' distance to destination. This operation is referred to as a "diffusing computation". The advantage of this protocol is that it eliminates the search-to-infinity problem present in some of the on-demand routing protocols by stopping multiple flood searches when the required destination is no longer reachable. Another advantage is that each router maintains entries (in a route table) for destinations, which flow data packets through them (i.e., the router is a node which completes/or connects a router to the destination). This reduces significant amount of storage space and bandwidth needed to maintain an up-to-date routing table. Another novelty of ROAM is that each time the distance of a router to a destination changes by more than a defined threshold, it broadcasts update messages to its neighboring nodes. Although this has the benefit of increasing the network connectivity, in highly dynamic networks it may prevent nodes entering sleep mode to conserve power.

2.4. Light-Weight Mobile Routing (LMR)

The LMR protocol is an on-demand routing protocol, which uses a flooding technique to determine its routes. The nodes in LMR maintain multiple routes to each required destination. This increases the reliability of the protocol by allowing nodes to select the next available route to a particular destination without initiating a route discovery procedure. Another advantage of this protocol is that each node only maintains routing information to their neighbors. This means avoids extra delays and storage overheads associated with maintaining complete routes. However, LMR may produce temporary invalid routes, which introduces extra delays in determining a correct loop.

2.5. Temporally Ordered Routing Algorithm (TORA)

The TORA routing protocol is based on the LMR protocol. It uses similar link reversal and route repair procedure as in LMR, and also the creation of a DAGs, which is similar to the query/reply process used in LMR [30]. Therefore, it also has similar benefits to LMR. The advantage of TORA is that it has reduced the far-reaching control messages to a set of neighboring nodes, where the topology change has occurred. Another advantage of TORA is that it also supports multicasting, however this is not incorporated into its basic operation. TORA can be used in conjunction with lightweight adaptive multicast algorithm (LAM) to provide multicasting. The disadvantage of TORA is that the algorithm may also produce temporary invalid routes as in LMR.

2.6. Associativity-Based Routing (ABR)

ABR [33] is another source initiated routing protocol, which also uses a query-reply technique to determine routes to the required destinations. However, in ABR route selection is primarily based on stability. To select stable route each node maintains an associativity tick with their neighbors, and the links with higher associativity tick are selected in preference to the once with lower associativity tick. However, although this may not lead to the shortest path to the destination, the routes tend to last longer. Therefore, fewer route reconstructions are needed, and more bandwidth will be available for data transmission. The disadvantage of ABR is that it requires periodic beaconing to determine the degree of associativity of the links. This beaconing requirement requires all nodes to stay active at all time, which may result in additional power consumption. Another disadvantage is that it does not maintain multiple routes or a route cache, which means that alternate routes will not be immediately available, and a route discovery will be required using link failure. However, ABR has to some degree compensated for not having multiple routes by initiating a localized route discovery procedure (i.e., LBQ).

2.7. Signal Stability Adaptive (SSA)

SSA [9] is a descendent of ABR. However, SSA selects routes based on signal strength and location stability rather than using an associativity tick. As in ABR, the routes selected in SSA may not result in the shortest path to the destination. However, they tend to live longer, which means fewer route reconstructions are needed. One disadvantage of SSA when compared to DSR and AODV is that intermediate nodes cannot reply to route requests sent toward a destination, which may potentially create long delays before a route can be discovered. This is because the destination is responsible for selecting the route for data transfer. Another disadvantage of SSA is that no attempt is made to repair routes at the point where the link failure occurs (i.e., such as an LBQ in ABR). In SSA the reconstruction occurs at the source. This may introduce extra delays, since the source must be notified of the broken like before another one can be found.

2.8. Relative Distance Micro-Discovery Ad Hoc Routing (RDMAR)

RDMR [1] attempts to minimize the routing overheads by calculating the distance between the source and the destination and therefore limiting each route request packet to certain number of hops. This means that the route discovery procedure can be confined to localized region (i.e., it will not have a global affect). RDMR also uses the same technique when link failures occur (i.e., route maintenance), thus conserving a significant amount of bandwidth and battery power. Another advantage of RDMR is that it does not require a location aided technology (such as a GPS) to determine the routing patterns. However, the relative-distance micro-discovery procedure can only be applied if the source and the destinations have communicated previously. If no previous communication record is available for a particular source and destination, then the protocol will behave in the same manner as the flooding algorithms (i.e., route discovery will have a global affect).

2.9. Location-Aided Routing (LAR)

LAR [21] is based on flooding algorithms (such as DSR). However, LAR attempts to reduce the routing overheads present in the traditional flooding algorithm by using location information. This protocol assumes that each node knows its location through a GPS. Two different LAR schemes were proposed in [21], the first scheme calculates a request zone which defines a boundary where the route request packets can travel to reach the required destination. The second method stores the coordinates of the destination in the route request packets. These packets can only travel in the direction where the relative distance to the destination becomes smaller as they travel from one hop to another. Both methods limit the control overhead transmitted through the network and hence conserve bandwidth. They will also determine the shortest path (in most cases) to the destination, since the route request packets travel away from the source and towards the destination. The disadvantage of this protocol is that each node is required to carry a GPS. Another disadvantage is (especially for the first method), that protocols may behave similar to flooding protocols (e.g. DSR and AODV) in highly mobile networks.

2.10. Ant-Colony-Based Routing Algorithm (ARA)

ARA [13] attempt to reduce routing overheads by adopting the food searching behavior of ants. When ants search for food they start from their nest and walk towards the food, while leaving behind a transient trail of pheromones. This indicates the path that has been taken by the ant and allows others to follow, until the pheromone disappears. Similar to AODV and DSR, ARA is also made up of two phases (route discovery and route maintenance). During route discovery, a Forwarding Ant (FANT) is propagated through the network (similar to a RREQ). At each hop, each node calculates a pheromone value depending on how many number of hops the FANT has taken to reach them. The nodes then forward the FANT to their neighbors. Once the destination is reached, it creates a Backward Ant (BANT), and returns it to the source. When the source receives the BANT from the destination node, a path is determined and data packet dissemination begins. To maintain each route, each time a data packet travels between intermediate nodes the pheromone value is increased. Otherwise the pheromone value is decreased overtime until it expires. To repair a broken link, the nodes firstly check their routing table, if no route is found they inform their neighbors for an alternate route. If the neighbors do have a route they inform their neighbors by backtracking. If the source node is reached and no route is found, a new route discovery process is initiated. The advantage of this strategy is that the size of each FANT and BANT is small, which means the amount of overhead per control packet introduced in the network is minimized. However, the route discovery process it based on flooding, which means that the protocol may have scalability problems as the number of nodes and flows in the network grows.

2.11. Flow Oriented Routing Protocol (FORP)

FORP [32] attempts to reduce the effect of link failure due to mobility during data transmission, by predicting when a route is going to be broken and therefore using an alternate link before route failure is experienced. To do this, when a node requires a route to a particular destination and a route is not already available, a Flow_REQ message is broadcasted through the network in a similar manner to a Route Request in DSR. However, in FORP, each node that receives a Flow_REQ calculates a Link Expiration Time (LET) with the previous hop (using a GPS) and appends this value to the Flow_REQ packet which is then rebroadcasted. When a Flow_REQ packet reaches the destination, a Route Expiration Time (RET) is calculated using the minimum of all the LETs for each node in the route and a Flow_SETUP packet is sent back toward the source. During data transmission, each intermediate node appends their LET to the data packet. This allows the destination to predict when a link failure could occur. When the destination determines that a route is about to expire, a Flow_HANDOFF message is generated and propagated via flooding (similar to a Flow_REQ). Therefore, when the source receives a Flow_HANDOFF message, it can determine the best route to handoff the flow based on the given information (such as RET and hop count, etc.) in the Flow_HANDOFF packet. The source then sends a Flow_SETUp message along the newly chosen route. The advantage of this strategy compared to other on-demand routing protocols described above is that it minimizes the disruptions of real time sessions due to mobility by attempting to maintain constant flow of data. However, since it is based on pure flooding, the protocol may experience scalability problems in large networks.

2.12. Cluster-Based Routing Protocol (CBRP)

Unlike the on-demand routing protocols described above. In CBRP [17] the nodes are organized in a hierarchy. As most hierarchical protocols described above, the nodes in CBRP are grouped into clusters. Each cluster has a clusterhead, which coordinates the data transmission within the cluster and to other clusters. The advantage of CBRP is that only cluster heads exchange routing information, and therefore the number of control overhead transmitted through the network is far less than the traditional flooding methods. However, as in any other hierarchical routing protocol, there are overheads associated with cluster formation and maintenance. The protocol also suffers from temporary routing loops. This is because some nodes may carry inconsistent topology information due to long propagation delay.

2.13 Geographic Addressing and Routing

Geographic Addressing and Routing (GeoCast) [40] allows messages to be sent to all nodes in a specific geographical area using geographic information instead of logical node addresses. A geo-graphic destination address is expressed in three ways: point, circle (with center point and radius), and polygon (a list of points, e.g., P(1), P(2), . . . , P(n−1), P(n), P(1)). A point is represented by geo-graphic coordinates (latitude and longitude). When the destination of a message is a polygon or circle, every node within the geographic region of the polygon/circle will receive the message. A geographic router (GeoRouter) calculates its service area (geographic area it serves) as the union of the geographic areas covered by the networks attached to it. This service area is approximated by a single closed polygon. GeoRouters exchange service area polygons to build routing tables. This approach builds hierarchical structure (possibly wireless) consisting of GeoRouters. The end users can move freely about the network.

Data communication starts from a computer host capable of receiving and sending geographic messages (GeoHost). Data packets are then sent to the local GeoNode (residing in each subnet), which is responsible for forwarding the packets to the local GeoRouter. A GeoRouter first checks whether its service area intersects the destination polygon. As long as a part of the destination area is not covered, the GeoRouter sends a copy of the packet to its parent router for further routing beyond its own service area. Then it checks the service area of its child routers for possible intersection. All the child routers intersecting the target area are sent a copy of the packet. When a router's service area falls within the target area, the router picks up the packet and forwards it to the GeoNodes attached to it. As GeoCast is designed for group reception, multicast groups for receiving geographic messages are maintained at the GeoNodes. The incoming geographic messages are stored for a lifetime (determined by the sender) and during the time, they are multicast periodically through assigned multicast address. Clients at GeoHosts tune into the appropriate multicast address to receive the messages.

2.14 Greedy Perimeter Stateless Routing (GPSR)

Greedy Perimeter Stateless Routing (GPSR) [41] is a routing protocol that uses only neighbor location information in forwarding data packets. It requires only a small amount of per-node routing state, has low routing message complexity, and works best for dense wireless networks. In GPSR, beacon messages are periodically broadcast at each node to inform its neighbors of its position, which results in minimized one-hop-only topology information at each node. To further reduce the beacon overhead, the position information is piggybacked in all the data packets a node sends. GPSR assumes that sources can determine through separate means the location of destinations and include such locations in the data packet header. A node makes forwarding decisions based on the relative position of destination and neighbors. GPSR uses two data forwarding schemes: greedy forwarding and perimeter forwarding. The former is the primary forwarding strategy, while the latter is used in regions where the primary one fails. Greedy forwarding works this way: when a node receives a packet with the destination's location, it chooses from its neighbors the node that is geographically closest to the destination and then forwards the data packet to it. This local optimal choice repeats at each intermediate node until the destination is reached. When a packet reaches a dead end (i.e., a node whose neighbors are all farther away from the destination than itself), perimeter forwarding is performed. Before performing the perimeter forwarding, the forwarding node needs to calculate a relative neighborhood graph (RNG). Perimeter forwarding traverses the RNG using the right-hand rule hop by hop along the perimeter of the region. During perimeter forwarding, if the packet reaches a location that is closer to the destination than the position where the previous greedy forwarding of the packet failed, the greedy process is resumed. Possible loops during perimeter forwarding occur when the destination is not reachable. These will be detected and packets dropped. In the worst case, GPSR will possibly generate a very long path before a loop is detected.

2.15. Summary of Reactive Routing

Generally, most on-demand routing protocols have the same routing cost when considering the worst-case scenario. This is due to their fundamental routing nature, as they all follow similar route discovery and maintenance procedure. For example, protocols such as RDMR and LAR have the same cost as the traditional flooding algorithm in the worst-case scenario. The worst-case scenario applies to most routing protocols when there is no previous communication between the source and the destination. This is usually the case during the initial stages (i.e., when a node comes on-line). As the nodes stay longer on, they are able to update their routing tables/caches and become more aware of their surroundings. Some protocols take advantage of this more than the others. For example, in DSR when a route to a destination has expired in the route cache, the protocol initiates a network wide flooding search to find an alternate route. This is not the case for LAR or RDMR where the route history is used to control the route discovery procedure by localizing the route requests to a calculated region. Clearly, this is more advantageous in large networks, since more bandwidth is available there for data transmission. Another method used to minimize the number of control packets is to select routes based on their stability. In ABR and SSR the destination nodes select routes based on their stability. ABR also allows shortest path route selection to be used during the route selection at the destination (but only secondary to stability), which means that shorter delays may be experienced in ABR during data transmission than in SSR. These protocols may perform better than the purely shortest path selection based routing protocols such as DSR. However, they may experience scalability problem in large network since each packet is required to carry the full destination address. This is because the probability of a node in a selected route becoming invalid will increase by O(a.n), where "a" is the probability of the route failing at a node and "n" is the number of nodes in the route.

Therefore, these protocols are only suitable for small to medium size networks. Reduction in control overhead can be obtained by introducing a hierarchical structure to the network. CBRP is a hierarchical on-demand routing protocol, which attempts to minimize control overheads disseminated into the network by breaking the network into clusters. During the route discovery phase, clusterheads (rather than each intermediate node) exchange routing information. This significantly reduces the control overhead disseminated into the network when compared to the flooding algorithms. In highly mobile networks, CBRP may incur significant amount of processing overheads during cluster formation/maintenance. This protocol suffers from temporary invalid routes as the destination nodes travel from one cluster to another. Therefore, this protocol is suitable for medium size networks with slow to moderate mobility. The protocol may also best perform in scenarios with group mobility where the nodes within a cluster are more likely to stay together.

3. Hybrid Routing Protocols

Hybrid routing protocols are both proactive and reactive in nature. These protocols are designed to increase scalability by allowing nodes with close proximity to work together to form some sort of a backbone to reduce the route discovery overheads. This is mostly achieved by proactively maintaining routes to nearby nodes and determining routes to far away nodes using a route discovery strategy. Most hybrid protocols proposed to date are zone-based, which means that the network is partitioned or seen as a number of zones by each node. Others group nodes into trees or clusters. The discussion below is limited to different hybrid routing protocol proposed for MANETs.

3.1. Zone Routing Protocol (ZRP)

In ZRP [14], the nodes have a routing zone, which defines a range (in hops) that each node is required to maintain network connectivity proactively. Therefore, for nodes within the routing zone, routes are immediately available. For nodes that lie outside the routing zone, routes are determined on-demand (i.e., reactively), and it can use any on-demand routing protocol to determine a route to the required destination. The advantage of this protocol is that it has significantly reduced the amount of communication overhead when compared to pure proactive protocols. It also has reduced the delays associated with pure reactive protocols such as DSR, by allowing routes to be discovered faster. This is because, to determine a route to a node outside the routing zone, the routing only has to travel to a node which lies on the boundaries (edge of the routing zone) of the required destination. Since the boundary node would proactively maintain routes to the destination (i.e., the boundary nodes can complete the route from the source to the destination by sending a reply back to the source with the required routing address). The disadvantage of ZRP is that for large values of routing zone the protocol can behave like a pure proactive protocol, while for small values it behaves like a reactive protocol.

3.2. Zone-Based Hierarchical Link State (ZHLS)

Unlike ZRP, ZHLS [18] routing protocol employs hierarchical structure. In ZHLS, the network is divided into non-overlapping zones, and each node has a node ID and a zone ID, which is calculated using a GPS. The hierarchical topology is made up of two levels: node level topology and zone level topology, as described previously. In ZHLS, location management is simplified. This is because no clusterhead or location manager is used to coordinate the data transmission. This means there is no processing overhead associated with clusterhead or Location Manager selection when compared to HSR, MMWN and CGSR protocols. This also means that a single point of failure and traffic bottlenecks can be avoided. Another advantage of ZHLS is that it has reduced the communication overheads when compared to pure reactive protocols such as DSR and AODV. In ZHLS, when a route to a remote destination is required (i.e., the destination is in another zone), the source node broadcast a zone-level location request to all other zones, which generates significantly lower overhead when compared to the flooding approach in reactive protocols. Another advantage of ZHLS is that the routing path is adaptable to the changing topology since only the node ID and the zone ID of the destination is required for routing. This means that no further location search is required as long as the destination does not migrate to another zone. However, in reactive protocols, any intermediate link breakage would invalidate the route and may initiate another route discovery procedure. The Disadvantage of ZHLS is that all nodes must have a preprogrammed static zone map in order to function. This may not feasible in applications where the geographical boundary of the network is dynamic. Nevertheless, it is highly adaptable to dynamic topologies and it generates far less overhead than pure reactive protocols, which means that it may scale well to large networks.

3.3. Scalable Location Update Routing Protocol (SLURP)

Similar to ZLHS, in SLURP [34] the nodes are organized into a number of non-overlapping zones. However, SLURP further reduces the cost of maintaining routing information by eliminating a global route discovery. This is achieved by assigning a home region for each node in the network. The home region for each node is one specific zone (or region), which is determined using a static mapping function, f(NodeID)→regionID, where f is a many-to-one function that is static and known to all nodes. An example of a function that can perform the static zone mapping is f(NodeID)=g(NodeID)mod K[34], where g(NodeID) is a random number generating function that uses the node ID as the seed and output a large number, and k is the total number of home regions in the network. Since the node ID of each node is constant (i.e., a MAC address), then the function will always calculate the same home region. Therefore, all nodes can determine the home region for each node using this function, provided they have their node ID. Each node maintains its current location (current zone) with the home region by unicasting a location update message towards its home region. Once the location update packet reaches the home region, it is broadcasted to all the nodes in the home region. Hence, to determine the current location of any node, each node can unicast a location_discovery packet to the required nodes home region (or the area surrounding the home region) in order to find its current location. Once the location is found, the source can start sending data towards the destination using the most forward with fixed radius (MFR) geographical forwarding algorithm. When a data packet reaches the region in which the destination lies, then source routing is used to get the data packet to the destination. The disadvantage of SLURP is that it also relies on a preprogrammed static zone map (as does ZHLS).

3.4. Distributed Spanning Trees Based Routing Protocol (DST)

As mentioned earlier, in DST [28] the nodes in the network are grouped into a number of trees. Each tree has two types of nodes; route node, and internal node. The root controls the structure of the tree and whether the tree can merge with another tree, and the rest of the nodes within each tree are the regular nodes. Each node can be in one three different states; router, merge and configure depending on the type of task that it trying to perform. To determine a route DST proposes two different routing strategies; hybrid tree-flooding (HFT) and distributed spanning tree shuttling (DST). In HTF, control packets are sent to all the neighbors and adjoining bridges in the spanning tree, where each packet is held for a period of time called holding time. The idea behind the holding time is that as connectivity increases, and the network becomes more stable, it might be useful to buffer and route packets when the network connectivity is increased over time. In DST, the control packets are disseminated from the source are rebroadcasted along the tree edges. When a control reaches down to a leaf node, it is sent up the tree until it reaches a certain height referred to as the shuttling level. When the shuttling level is reached, the control packet can be sent down the tree or to the adjoining bridges. The main disadvantage of the DST algorithm is that it relies on a root node to configure the tree, which creates a single point of failure. Furthermore, the holding time used to buffer the packets may introduce extra delays in to the network.

3.5. Distributed Dynamic Routing (DDR)

DDR [24] is also a tree-based routing protocol. However, unlike DST, in DDR the trees do not require a root node. In this strategy trees are constructed using periodic beaconing messages which is exchanged by neighboring nodes only. The trees in the network form a forest, which is connected together via gateway nodes (i.e., nodes which are in transmission range but belong to different trees). Each tree in the forest forms a zone which is assigned a zone ID by running a zone naming algorithm. Since each node can only belong to a single zone (or tree), then the network can be also seen as a number of non-overlapping zones. The DDR algorithm consists of six phases: preferred neighbor election, forest construction, intra-tree clustering, inter-tree clustering, zone naming and zone partitioning. Each of these phases are executed based on information received in the beacon messages. During the initialization phase, each node starts in the preferred neighbor election phase. The preferred neighbor of a node is a node that has the largest number of neighbors. After this, a forest is constructed by connecting each node to their preferred neighbor. Next, the intra-tree clustering algorithm is initiated to determine the structure of the zone (or the tree) and to build up the intra-zone routing table. This is then followed by the execution of the inter-tree algorithm to determine the connectivity with the neighboring zones. Each zone is then assigned a name by running the zone naming algorithm and the network is partitioned into a number of non-overlapping zones. To determine routes, hybrid ad hoc routing protocols (HARP) [23] work on top of DDR. HARP uses the intra-zone and inter-zone routing tables created by DDR to determine a stable path between the source and the destination. The advantage of DDR is that unlike ZHLS, it does not rely on a static zone map to perform routing and it does not require a root node or a clusterhead to coordinate data and control packet transmission between different nodes and zones. However, the nodes that have been selected as preferred neighbors may become performance bottlenecks. This is because they would transmit more routing and data packets than every other node, and these nodes would require more recharging as they will have less sleep time than other nodes. If a node is a preferred neighbor for many of its neighbors, many nodes may want to communicate with it, and channel contention would increase around the preferred neighbor, which would result in larger delays experienced by all neighboring nodes before they can reserve the medium. In networks with high traffic, this may also result in significant reduction in throughput, due to packets being dropped when buffers become full.

3.6. Summary of Hybrid Routing

Hybrid routing protocols have the potential to provide higher scalability than pure reactive or proactive protocols. This is because they attempt to minimize the number of rebroadcasting nodes by defining a structure (or some sort of a backbone), which allows the nodes to work together in order organize how routing is to be performed. By working together, the best or the most suitable nodes can be used to perform route discovery. For example, in ZHLS only the nodes which lead to the gateway nodes the interzone route discovery packets. Collaboration between nodes can also help in maintaining routing information much longer. For example, in SLURP, the nodes within each region (or zone) work together to maintain location information about the nodes which are assigned to that region (i.e., their home region). This may potentially eliminate the need for flooding, since the nodes know exactly where to look for a destination every time. Hybrid routing protocols attempt to eliminate single point of failures and bottleneck nodes in the network. This is achieved by allowing any number of nodes to perform routing or data forwarding if the preferred path becomes unavailable.

REFERENCES

1. G. Aggelou, R. Tafazolli, RDMAR: a bandwidth-efficient routing protocol for mobile ad hoc networks, in: ACM International Workshop on Wireless Mobile Multimedia (WoWMoM), 1999, pp. 26-33.
2. S. Basagni, I. Chlamtac, V. R. Syrotivk, B. A. Woodward, A distance effect algorithm for mobility (DREAM), in: Proceedings of the Fourth Annual ACM/IEEE International Conference on Mobile Computing and Networking (Mobicom'98), Dallas, Tex., 1998.
3. R. E. Bellman, Dynamic Programming, Princeton University Press, Princeton, N.J. (1957).
4. B. Bellur, R. G. Ogier, F. L Templin, Topology broadcast based on reverse-path forwarding routing protocol (tbrpf), in: Internet Draft, draft-ietf-manet-tbrpf-06.txt, work in progress, 2003.
5. T.-W. Chen, M. Gerla, Global state routing: a new routing scheme for ad-hoc wireless networks, in: Proceedings of the IEEE ICC, 1998.
6. C.-C. Chiang, Routing in clustered multihop mobile wireless networks with fading channel, in: Proceedings of IEEE SICON, April 1997, pp. 197-211.
7. M. S. Corson, A. Ephremides, A distributed routing algorithm for mobile wireless networks, ACM/Baltzer Wireless Networks, 1 (1) (1995), pp. 61-81.
8. S. Das, C. Perkins, E. Royer, Ad hoc on demand distance vector (AODV) routing, Internet Draft, draft-ietf-manet-aodv-11.txt, work in progress, 2002.
9. R. Dube, C. Rais, K. Wang, S. Tripathi, Signal stability based adaptive routing (ssa) for ad hoc mobile networks, IEEE Personal Communication, 4 (1) (1997), pp. 36-45.
10. L. R. Ford, D. R. Fulkerson, Flows in Networks, Princeton University Press, Princeton, N.J. (1962).
11. J. J. Garcia-Luna-Aceves, C. Marcelo Spohn, Source-tree routing in wireless networks, in: Proceedings of the Seventh Annual International Conference on Network Protocols Toronto, Canada, October 1999, p. 273.
12. M. Gerla, Fisheye state routing protocol (FSR) for ad hoc networks, Internet Draft, draft-ietf-manet-aodv-03.txt, work in progress, 2002.
13. M. Günes, U. Sorges, I. Bouazizi, Ara—the ant-colony based routing algorithm for manets, in: ICPP workshop on Ad Hoc Networks (IWAHN 2002), August 2002, pp. 79-85.
14. Z. J. Hass, R. Pearlman, Zone routing protocol for ad-hoc networks, Internet Draft, draft-ietf-manet-zrp-02.txt, work in progress, 1999.
15. A. Iwata, C. Chiang, G. Pei, M. Gerla, T. Chen, Scalable routing strategies for multi-hop ad hoc wireless networks, IEEE Journal on Selected Areas in Communcations, 17 (8) (1999), pp. 1369-1379.
16. P. Jacquet, P. Muhlethaler, T. Clausen, A. Laouiti, A. Qayyum, L. Viennot, Optimized link state routing protocol for ad hoc networks, IEEE INMIC, Pakistan, 2001.
17. M. Jiang, J. Ji, Y. C. Tay, Cluster based routing protocol, Internet Draft, draft-ietf-manet-cbrp-spec-01.txt, work in progress, 1999.
18. M. Joa-Ng, I.-T. Lu, A peer-to-peer zone-based two-level link state routing for mobile ad hoc networks, IEEE Journal on Selected Areas in Communications, 17 (8) (1999), pp. 1415-1425.
19. D. Johnson, D. Maltz, J. Jetcheva, The dynamic source routing protocol for mobile ad hoc networks, Internet Draft, draft-ietf-manet-dsr-07.txt, work in progress, 2002.
20. K. K. Kasera, R. Ramanathan, A location management protocol for hierarchically organised multihop mobile wireless networks, in: Proceedings of the IEEE ICUPC'97, San Diego, Calif., October 1997, pp. 158-162.
21. Y.-B. Ko, N. H. Vaidya, Location-aided routing (LAR) in mobile ad hoc networks, in: Proceedings of the Fourth Annual ACM/IEEE International Conference on Mobile Computing and Networking (Mobicom'98), Dallas, Tex., 1998.
22. S. Murthy J. J. Garcia-Luna-Aceves, A routing protocol for packet radio networks, in: Proceedings of the First Annual ACM International Conference on Mobile Computing and Networking, Berkeley, Calif., 1995, pp. 86-95.
23. N. Nikaein, C. Bonnet, N. Nikaein, Harp-hybrid ad hoc routing protocol, in: Proceedings of IST: International Symposium on Telecommunications, September 1-3 Tehran, Iran, 2001.
24. N. Nikaein, H. Laboid, C. Bonnet, Distributed dynamic routing algorithm (ddr) for mobile ad hoc networks, in: Proceedings of the MobiHOC 2000: First Annual Workshop on Mobile Ad Hoc Networking and Computing, 2000.
25. V. D. Park, M. S. Corson, A highly adaptive distributed routing algorithm for mobile wireless networks, in: Proceedings of INFOCOM, April 1997.
26. G. Pei, M. Gerla, X. Hong, C. Chiang, A wireless hierarchical routing protocol with group mobility, in: Proceedings of Wireless Communications and Networking, New Orleans, 1999.
27. C. E. Perkins, T. J. Watson, Highly dynamic destination sequenced distance vector routing (DSDV) for mobile computers, in: ACM SIGCOMM'94 Conference on Communications Architectures, London, UK, 1994.
28. S. Radhakrishnan, N. S. V Rao, G. Racherla, C. N. Sekharan, S. G. Batsell, DST—A routing protocol for ad hoc networks using distributed spanning trees, in: IEEE Wireless Communications and Networking Conference, New Orleans, 1999.
29. J. Raju, J. Garcia-Luna-Aceves, A new approach to on-demand loop-free multipath routing, in: Proceedings of the 8th Annual IEEE International Conference on Computer Communications and Networks (ICCCN), Boston, Mass., October 1999, pp. 522-527.
30. E. M. Royer, C.-K. Toh, A review of current routing protocols for ad hoc mobile wireless networks, IEEE Personal Communications, 6 (2) (1999), pp. 46-55.
31. A. Udaya Shankar, C. Alaettinoglu, I. Matta, K. Dussa-Zieger, Performance comparison of routing protocols using MaRS: distance-vector versus link-state, in: Proceedings of the 1992 ACM SIGMETRICS and PERFORMANCE '92 Int'l. Conf. on Measurement and Modeling of Computer Systems, Newport, R.I., USA, 1-5 June 1992, p. 181.
32. W. Su, M. Gerla, Ipv6 flow handoff in ad-hoc wireless networks using mobility prediction, in: IEEE Global Communications Conference, Rio de Janeiro, Brazil, December 1999, pp. 271-275.
33. C. Toh, A novel distributed routing protocol to support ad-hoc mobile computing, in: IEEE 15th Annual International Phoenix Conf., 1996, pp. 480-486.

34. S.-C. Woo, S. Singh, Scalable routing protocol for ad hoc networks, Wireless Networks, 7 (5) (2001), pp. 513-529.
35. G. Pei, M. Gerla and X. Hong, "LANMAR: Landmark Routing for Large Scale Wireless Ad Hoc Networks with Group Mobility," Proc. IEEE/ACM Mobi-HOC 2000, Boston, Mass., August 2000, pp. 11-18.
36. X. Hong et al., "Scalable Ad Hoc Routing in Large, Dense Wireless Net-works Using Clustering and Landmarks," Proc. ICC 2002, New York, N.Y., April 2002.
37. M. Gerla, X. Hong, and G. Pei, "Landmark Routing for Large Ad Hoc Wireless Networks," Proc. IEEE GLOBECOM 2000, San Francisco, Calif., November 2000.
38. C. E. Perkins and P. Bhagwat, "Highly Dynamic Destination-Sequenced Distance-Vector Routing (DSDV) for Mobile Computers," Proc. ACM SIGCOMM '94, London, U.K., September 1994, pp. 234-44.
39. X. Hong, K. Xu, M. Gerla, "Scalable Routing Protocols for Mobile Ad Hoc Networks", IEEE Network, July/August 2002, pp. 11-21.
40. J. C. Navas and T. Imielinski, "Geographic Addressing and Routing," Proc. 3rd ACM/IEEE Intn'l. Conf. Mobile Comp. Net., Budapest, Hungary, Sep. 26-30, 1997.
41. B. Karp and H. T. Kung, "GPSR: Greedy Perimeter Stateless Routing for Wireless Networks," Proc. 6th Annual Int'l. Conf. Mobile Computing and Networking (MobiCom 2000), Boston, Mass., USA, 2000, pp. 243-54.

See, e.g., U.S. Pat. Nos. 6,047,330; 6,415,158; 6,421,349; 6,584,080; 6,625,135; 6,628,620; 6,647,426; 6,678,252; 6,704,301; 6,718,394; 6,745,027; 6,754,192; 6,763,013; 6,763,014; 6,766,309; 6,775,258; 6,807,165; 6,813,272; 6,816,460; 6,836,463; 6,845,091; 6,870,846; 6,873,839; 6,879,574; 6,894,985; 6,898,529; 6,904,275; 6,906,741; 6,909,706; 6,917,618; 6,917,985; 6,934,540; 6,937,602; 6,954,435; 6,954,790; 6,958,986; 6,961,310; 6,975,614; 6,977,608; 6,980,537; 6,982,982; 6,985,476; 6,986,161; 6,996,084; 7,006,437; 7,006,453; 7,007,102; 7,016,325; 7,016,336; 7,027,409; 7,027,426; 7,028,099; 7,028,687; 7,031,288; 7,031,293; 7,039,035; 7,061,924; 7,061,925; 7,068,600; 7,068,605; 7,069,483; 7,075,919; 7,079,509; 7,079,552; 7,082,117; 7,085,241; 7,085,290; 7,088,717; 7,092,391; 7,092,943; 7,096,037; 7,096,359; 7,099,296; 7,116,661; 7,127,250; 7,133,391; 7,133,704; 7,142,866; 7,151,757; 7,151,769; 7,155,264; 7,155,518; 7,161,929; 7,170,425; 7,176,807; 7,177,295; 7,177,646; 7,184,421; 7,190,678; 7,194,010; 7,197,016; 7,200,132; 7,209,468; 7,209,771; 7,209,978; 7,212,504; 7,215,926; 7,216,282; 7,221,668; 7,224,642; 7,230,916; 7,242,678; 7,251,238; 7,251,489; 7,263,063; 7,266,085; 7,266,104; 7,269,147; 7,271,736; 7,281,057; 7,295,556; 7,298,743; 7,299,038; 7,299,042; 7,305,459; 7,308,369; 7,308,370; 7,315,548; 7,317,898; 7,324,824; 7,327,683; 7,327,998; 7,330,694; 7,333,461; 7,339,897; 7,339,925; 7,342,895; 7,346,015; 7,346,167; 7,348,895; 7,349,362; 7,349,370; 7,356,001; 7,359,358; 7,362,711; 7,362,727; 7,366,111; 7,366,544; 7,367,497; 7,376,122; 7,382,765; 7,389,295; 7,391,742; 7,394,774; 7,394,798; 7,394,826; 7,397,785; 7,397,789; 7,400,596; 7,400,903; 7,406,078; 7,408,911; 7,414,977; 7,415,019; 7,417,962; 7,418,238; 7,420,944; 7,420,952; 7,420,954; 7,423,985; 7,427,927; 7,428,221; 7,443,822; 7,450,517; 7,451,365; 7,453,864; 7,457,304; 7,457,834; 7,463,612; 7,463,907; 7,466,665; 7,466,676; 7,468,954; 7,480,248; 7,486,651; 7,489,635; 7,489,932; 7,492,787; 7,495,578; 7,496,059; 7,496,600; 7,505,450; 7,512,079; 7,512,094; 7,512,783; 7,515,551; 7,522,547; 7,522,568; 7,522,731; 7,529,547; 7,529,561; 7,532,585; 7,535,883; 7,536,388; 7,539,759; 7,545,285; 7,546,126; 7,561,024; 7,561,525; 7,564,842; 7,564,862; 7,567,547; 7,567,577; 7,580,380; 7,580,382; 7,580,730; 7,580,782; 7,581,095; 7,586,853; 7,586,897; 7,587,001; 7,590,589; 7,593,377; 7,593,385; 7,596,152; 7,599,696; 7,602,738; 7,606,176; 7,606,178; 7,606,938; 7,609,644; 7,609,672; 7,616,961; 7,620,366; 7,620,708; 7,626,931; 7,626,966; 7,626,967; 7,633,865; 7,633,884; 7,634,230; 7,639,652; 7,643,467; 7,646,754; 7,649,852; 7,649,872; 7,649,884; 7,649,896; 7,653,003; 7,653,011; 7,653,355; 7,656,851; 7,656,857; 7,656,901; 7,657,354; 7,657,373; 7,660,305; 7,660,318; 7,660,950; 7,664,111; 7,664,538; 7,668,119; 7,668,137; 7,668,173; 7,672,307; 7,675,863; 7,675,882; 7,678,068; 7,680,088; 7,680,091; 7,684,314; 7,688,847; 7,689,224; 7,693,064; 7,693,093; 7,693,167; 7,693,484; 7,695,446; 7,697,940; 7,698,463; 7,701,858; 7,701,935; 7,702,594; 7,706,282; 7,706,327; 7,706,369; 7,706,842; 7,710,896; 7,710,932; 7,715,396; 7,719,988; 7,720,037; 7,725,080; 7,729,336; 7,733,818; 7,739,402; 7,742,399; 7,742,430; 7,746,794; 7,751,360; 7,751,420; 7,753,795; 7,756,041; 7,760,701; 7,760,735; 7,764,617; 7,768,926; 7,768,992; 7,773,575; 7,778,235; 7,778,270; 7,787,361; 7,787,450; 7,787,480; 7,788,387; 7,796,511; 7,796,573; 7,800,812; 7,801,042; 7,808,939; 7,808,985; 7,808,987; 7,813,326; 7,813,451; 7,814,322; 7,817,623; 7,821,994; 7,822,023; 7,826,372; 7,830,820; 7,839,791; 7,843,861; 7,847,734; 7,848,702; 7,848,757; 7,849,139; 7,852,816; 7,852,826; 7,855,981; 7,859,465; 7,860,025; 7,860,081; 7,860,968; 7,869,792; 7,873,019; 7,881,206; 7,881,229; 7,881,474; 7,881,667; 7,886,075; 7,889,655; 7,889,691; 7,889,743; 7,890,112; 7,894,374; 7,894,416; 7,894,828; 7,898,977; 7,898,979; 7,898,993; 7,899,005; 7,899,027; 7,902,973; 7,905,640; 7,911,962; 7,912,645; 7,912,982; 7,924,722; 7,924,726; 7,924,745; 7,924,761; 7,924,796; 7,929,914; 7,933,236; 7,936,678; 7,936,697; 7,936,732; 7,940,668; 7,940,716; 7,941,188; 7,944,878; 7,948,931; 7,948,966; 7,957,355; 7,957,410; 7,958,271; 7,961,626; 7,961,650; 7,962,101; 7,962,154; 7,965,671; 7,965,678; 7,969,914; 7,970,418; 7,974,402; 7,978,062; 7,978,612; 7,978,672; 7,978,725; 7,979,311; 7,983,239; 7,983,619; 7,983,835; 7,990,897; 7,990,947; 7,995,501; 7,995,524; 7,996,558; 8,005,054; 8,009,591; 8,014,404; 8,023,423; 8,027,273; 8,031,605; 8,031,720; 8,032,746; 8,035,479; 8,040,863; 8,041,369; 8,042,048; 8,054,819; 8,059,544; 8,059,578; 8,059,620; 8,060,017; 8,060,308; 8,060,590; 8,060,649; 8,064,377; 8,064,416; 8,065,166; 8,065,411; 8,072,902; 8,072,906; 8,072,992; 8,073,384; 8,077,663; 8,081,658; 8,085,686; 8,089,866; 8,089,970; 8,090,596; 8,094,583; 8,098,421; 8,099,108; 8,099,307; 8,102,775; 8,106,792; 8,107,397; 8,108,228; 8,108,429; 8,111,619; 8,112,082; 8,115,617; 8,117,440; 8,120,839; 8,121,086; 8,121,628; 8,121,870; 8,125,928; 8,126,473; 8,127,039; 8,130,654; 8,130,656; 8,130,663; 8,130,708; 8,131,569; 8,131,838; 8,134,950; 8,134,995; 8,135,021; 8,135,362; 8,138,690; 8,138,934; 8,139,504; 8,144,595; 8,144,596; 8,144,619; 8,144,671; 8,144,708; 8,149,716; 8,149,748; 8,151,140; 8,155,008; 8,155,045; 8,161,097; 8,161,283; 8,165,143; 8,165,585; 8,169,974; 8,170,030; 8,170,577; 8,170,957; 8,171,364; 8,174,381; 8,179,837; 8,180,294; 8,184,681; 8,189,561; 8,194,541; 8,195,483; 8,195,628; 8,199,753; 8,200,246; 8,203,463; 8,203,464; 8,203,971; 8,208,368; 8,208,465; 8,213,352; 8,213,409; 8,213,895; 8,217,805; 8,218,519; 8,218,522; 8,223,680; 8,228,954; 8,230,108; 8,232,745; 8,233,463; 8,238,288; 8,238,346; 8,239,169; 8,243,603; 8,248,947; 8,249,101; 8,249,984; 8,254,348; 8,255,469; 8,256,681; 8,266,657; 8,270,302; 8,270,341; 8,271,449; 8,275,824; 8,280,345; 8,284,045; 8,284,670; 8,284,741; 8,289,182; 8,289,186; 8,291,112; 8,300,538; 8,300,551; 8,300,615; 8,311,533; 8,314,717; 8,315,218;

8,315,231; 8,315,565; 8,315,636; 8,319,658; 8,319,833; 8,320,288; 8,320,302; 8,320,414; 8,323,189; 8,325,612; 8,325,627; 8,330,649; 8,331,262; 8,332,055; 8,334,787; 8,335,164; 8,335,207; 8,335,814; 8,335,989; 8,339,069; 8,339,948; 8,341,279; 8,341,289; 8,345,098; 8,345,555; 8,346,846; 8,351,339; 8,352,420; 8,355,410; 8,356,078; 8,358,660; 8,359,643; 8,363,662; 8,364,648; 8,368,321; 8,369,216; 8,369,880; 8,370,697; 8,370,894; 8,373,362; 8,373,556; 8,373,588; 8,374,352; 8,385,322; 8,385,550; 8,386,278; 8,391,271; 8,391,778; 8,392,541; 8,395,498; 8,396,602; 8,400,507; 8,401,464; 8,401,564; 8,406,153; 8,406,177; 8,406,239; 8,406,248; 8,406,252; 8,422,497; 8,422,957; 8,428,517; 8,432,820; 8,441,958; 8,442,023; 8,442,057; 8,442,520; 8,447,419; 8,447,849; 8,447,875; 8,451,744; 8,451,807; 8,457,005; 8,462,691; 8,463,238; 8,467,297; 8,467,309; 8,467,991; 8,472,348; 8,473,616; 8,473,633; 8,473,989; 8,475,368; 8,477,687; 8,477,689; 8,483,616; 8,484,661; 8,488,589; 8,489,701; 8,489,765; 8,493,849; 8,494,458; 8,495,244; 8,496,181; 8,498,224; 8,502,148; 8,502,640; 8,503,309; 8,503,677; 8,503,934; 8,504,921; 8,509,109; 8,509,245; 8,509,248; 8,509,762; 8,509,765; 8,510,025; 8,514,758; 8,514,825; 8,514,915; 8,515,409; 8,515,547; 8,516,575; 8,520,535; 8,520,676; 8,521,156; 8,525,692; 8,527,457; 8,527,622; 8,531,134; 8,532,071; 8,533,465; 8,533,758; 8,536,802; 8,537,714; 8,543,249; 8,543,809; 8,544,023; 8,547,875; 8,547,943; 8,547,981; 8,548,607; 8,552,664; 8,553,586; 8,553,688; 8,554,232; 8,559,434; 8,559,442; 8,559,447; 8,560,274; 8,561,200; 8,570,892; 8,570,954; 8,571,004; 8,571,046; 8,571,518; 8,571,519; 8,577,391; 8,578,015; 8,578,054; 8,582,470; 8,582,491; 8,583,671; 8,583,978; 8,587,427; 8,588,108; 8,593,135; 8,593,419; 8,593,986; 8,595,359; 8,599,822; 8,600,830; 8,605,671; 8,610,376; 8,610,377; 8,611,256; 8,612,386; 8,612,583; 8,615,257; 8,619,576; 8,619,644; 8,619,789; 8,620,772; 8,620,784; 8,621,201; 8,621,577; 8,622,837; 8,624,771; 8,625,515; 8,625,574; 8,626,344; 8,626,844; 8,626,948; 8,630,177; 8,630,275; 8,630,291; 8,630,314; 8,631,101; 8,636,395; 8,638,667; 8,638,762; 8,638,763; 8,652,038; 8,654,627; 8,654,649; 8,654,782; 8,660,108; 8,665,890; 8,667,084; 8,670,302; 8,670,374; 8,670,416; 8,670,746; 8,670,749; 8,675,645; 8,675,678; 8,681,693; 8,682,982; 8,687,558; 8,687,946; 8,688,041; 8,693,322; 8,693,345; 8,693,366; 8,693,372; 8,693,399; 8,699,333; 8,699,368; 8,699,377; 8,699,410; 8,700,301; 8,700,302; 8,700,536; 8,700,749; 8,705,379; 8,705,522; 8,706,072; 8,707,785; 8,711,704; 8,711,818; 8,712,711; 8,715,072; 8,718,055; 8,718,093; 8,719,563; 8,724,508; 8,724,533; 8,725,274; 8,727,978; 8,730,047; 8,730,875; 8,732,454; 8,732,727; 8,737,206; 8,737,268; 8,738,944; 8,743,750; 8,743,768; 8,743,866; 8,744,516; 8,747,313; 8,750,100; 8,750,167; 8,750,242; 8,751,063; 8,751,644; 8,754,589; 8,755,294; 8,755,331; 8,755,336; 8,755,763; 8,756,449; 8,760,339; 8,761,125; 8,761,175; 8,761,285; 8,762,518; 8,762,747; 8,762,852; 8,769,442; 8,774,050; 8,774,189; 8,774,192; 8,774,946; 8,780,201; 8,780,762; 8,780,920; 8,780,953; 8,781,462; 8,787,246; 8,787,392; 8,787,944; 8,788,516; 8,788,899; 8,792,154; 8,792,850; 8,792,880; 8,797,878; 8,797,944; 8,798,084; 8,798,094; 8,799,220; 8,799,510; 8,800,010; 8,804,603; 8,804,613; 8,805,550; 8,806,573; 8,806,633; 8,811,188; 8,812,419; 8,817,665; 8,817,795; 8,818,322; 8,818,522; 8,819,172; 8,819,191; 8,821,293; 8,823,277; 8,823,795; 8,824,336; 8,824,380; 8,824,471; 8,830,837; 8,831,279; 8,831,869; 8,832,428; 8,837,277; 8,837,528; 8,841,859; 8,842,180; 8,842,630; 8,842,659; 8,843,156; 8,843,241; 8,848,721; 8,848,970; 8,855,794; 8,855,830; 8,856,252; 8,856,323; 8,861,390; 8,862,774; 8,866,408; 8,867,329; 8,868,374; 8,872,379; 8,872,767; 8,872,915; 8,873,391; 8,873,526; 8,874,477; 8,874,788; 8,879,604; 8,879,613; 8,880,060; 8,885,501; 8,885,630; 8,886,227; 8,891,534; 8,891,588; 8,892,135; 8,892,271; 8,892,769; 8,897,158; 8,897,745; 8,902,794; 8,902,904; 8,908,516; 8,908,536; 8,908,621; 8,908,626; 8,918,480; 8,918,691; 8,923,186; 8,923,302; 8,923,422; 8,925,084; 8,929,375; 8,930,361; 8,930,374; 8,934,366; 8,934,496; 8,937,886; 8,938,270; 8,942,120; 8,942,197; 8,942,219; 8,942,301; 8,948,015; 8,948,046; 8,948,052; 8,948,229; 8,949,959; 8,953,457; 8,954,170; 8,954,582; 8,958,291; 8,958,339; 8,958,417; 8,959,539; 8,964,747; 8,964,762; 8,964,773; 8,964,787; 8,965,288; 8,966,018; 8,966,046; 8,966,557; 8,970,392; 8,970,394; 8,971,188; 8,972,159; 8,972,589; 8,976,007; 8,976,728; 8,982,708; 8,982,856; 8,984,277; 8,988,990; 8,989,052; 8,995,251; 8,996,666; 9,001,645; 9,001,669; 9,001,676; 9,001,787; 9,003,065; 9,008,092; 9,013,173; 9,013,983; 9,019,846; 9,020,008; 9,026,039; 9,026,273; 9,026,279; 9,026,336; 9,030,939; 9,037,896; 9,041,349; 9,042,267; 9,054,952; 9,055,105; 9,055,521; 9,059,929; 9,060,023; 9,060,322; 9,060,386; 9,071,533; 9,072,100; 9,072,133; 9,077,637; 9,077,772; 9,081,567; 9,083,627; 9,084,120; 9,088,983; 9,094,324; 9,094,853; 9,100,285; 9,100,772; 9,100,989; 9,106,555; 9,112,805; 9,118,539; 9,119,130; 9,119,142; 9,119,179; 9,124,482; 9,125,254; 9,128,172; 9,128,689; 9,130,863; 9,143,456; 9,143,912; 9,143,975; 9,148,373; 9,148,391; 9,152,146; 9,154,370; 9,154,407; 9,154,982; 9,155,020; 9,160,553; 9,160,760; 9,161,257; 9,161,290; 9,166,845; 9,166,880; 9,166,908; 9,167,496; 9,172,613; 9,172,636; 9,172,662; 9,172,738; 9,172,812; 9,173,168; 9,173,245; 9,176,832; 9,179,353; 9,185,070; 9,185,521; 9,189,822; 9,191,303; 9,191,377; 9,197,572; 9,198,033; 9,198,203; 9,203,928; 9,209,943; 9,210,045; 9,210,608; 9,210,647; 9,218,216; 9,219,682; 9,220,049; 9,225,589; 9,225,637; 9,225,639; 9,225,782; 9,226,182; 9,226,218; 9,230,104; 9,231,850; 9,231,965; 9,232,458; 9,236,904; 9,236,999; 9,237,220; 9,240,913; 9,246,586; 9,247,482; 9,253,021; 9,257,036; 9,258,702; 9,258,765; 9,261,752; 9,264,349; 9,264,355; 9,264,491; 9,264,892; 9,270,584; 9,271,178; 9,275,376; 9,276,845; 9,277,477; 9,277,482; 9,277,503; 9,281,865; 9,282,059; 9,282,383; 9,286,473; 9,288,066; 9,294,488; 9,294,878; 9,295,099; 9,300,569; 9,306,620; 9,306,833; 9,306,841; 9,311,670; 9,312,918; 9,313,275; 9,313,813; 9,317,377; 9,319,332; 9,325,626; 9,331,931; 9,332,072; 9,338,065; 9,338,727; 9,344,355; 9,344,950; 9,350,635; 9,350,683; 9,350,809; 9,351,155; 9,351,173; 9,356,858; 9,356,875; 9,357,331; 9,363,166; 9,363,651; 9,369,177; 9,369,351; 9,369,381; 9,369,923; 9,374,281; 9,385,933; 9,386,502; 9,386,578; 9,391,784; 9,391,806; 9,391,839; 9,391,878; 9,391,891; 9,392,020; 9,392,482; 9,398,035; 9,398,467; 9,398,568; 9,401,863; 9,402,216; 9,407,646; 9,411,916; 9,413,479; 9,413,643; 9,413,779; 9,417,691; 9,418,340; 9,419,920; 9,419,981; 9,426,035; 9,426,040; 9,426,716; 9,438,386; 9,444,598; 9,444,721; 9,444,727; 9,450,642; 9,450,857; 9,450,972; 9,450,978; 9,451,476; 9,455,903; 9,468,014; 9,473,364; 9,479,995; 9,485,153; 9,485,157; 9,485,174; 9,485,185; 9,485,673; 9,489,506; 9,490,419; 9,491,051; 9,491,076; 9,497,215; 9,503,359; 9,503,466; 9,504,051; 9,509,636; 9,510,264; 9,510,347; 9,515,914; 9,516,025; 9,521,158; 9,525,617; 9,526,030; 9,526,061; 9,531,635; 9,537,593; 9,537,789; 9,542,642; 9,544,018; 9,544,162; 9,544,220; 9,547,828; 9,549,363; 9,553,772; 9,553,773; 9,553,796; 9,554,322; 9,557,188; 9,559,750; 9,559,918; 9,563,440; 9,563,854; 9,565,108; 9,565,111; 9,576,404; 9,577,914; 9,577,915; 9,582,242; 9,585,113; 9,589,006; 9,590,692; 9,590,790; 9,590,896; 9,590,918;

9,596,169; 9,596,619; 9,602,159; 9,602,296; 9,602,379; 9,602,399; 9,602,420; 9,608,912; 9,609,553; 9,614,770; 9,615,264; 9,615,284; 9,621,457; 9,621,458; 9,626,628; 9,628,362; 9,628,371; 9,634,928; 9,634,982; 9,635,050; 9,641,382; 9,641,542; 9,642,064; 9,647,494; 9,648,517; 9,648,544; 9,648,547; 9,652,720; 9,654,389; 9,654,478; 9,658,509; 9,661,551; 9,667,501; 9,667,536; 9,667,556; 9,668,195; 9,672,346; 9,673,858; 9,674,207; 9,679,336; 9,686,312; 9,686,369; 9,686,792; 9,692,538; 9,692,644; 9,693,179; 9,693,297; 9,696,884; 9,698,864; 9,698,867; 9,699,768; 9,705,737; 9,705,914; 9,706,420; 9,706,598; 9,712,282; 9,712,332; 9,712,394; 9,712,423; 9,712,433; 9,713,061; 9,716,528; 9,722,905; 9,722,909; 9,723,538; 9,729,430; 9,730,017; 9,730,078; 9,730,100; 9,736,056; 9,743,339; 9,749,410; 9,756,549; 9,766,619; 9,769,821; 9,769,871; 9,774,410; 9,774,522; 9,774,534; 9,785,509; 9,788,329; 9,794,162; 9,794,179; 9,794,797; 9,794,808; 9,794,934; 9,800,493; 9,800,506; 9,801,215; 9,816,897; 9,818,136; 9,819,505; 9,820,142; 9,820,658; 9,832,705; 9,838,942; 9,842,202; 9,847,889; 9,848,345; 9,848,422; 9,848,459; 9,853,883; 9,860,961; 9,866,395; 9,866,431; 9,870,537; 9,876,747; 9,882,804; 9,883,507; 9,887,936; 9,887,974; 9,893,985; 9,895,604; 9,900,079; 9,900,119; 9,900,169; 9,906,434; 9,906,439; 9,917,785; 9,917,871; 9,922,196; 9,923,802; 9,923,832; 9,924,439; 9,924,550; 9,935,868; 9,942,894; 9,949,129; 9,955,423; 9,955,456; 9,961,144; 9,973,596; 9,979,615; 9,979,619; 9,985,716; 9,986,484; 9,992,091; RE42871; 20010040895; 20020012320; 20020039357; 20020061009; 20020062388; 20020069278; 20020071160; 20020080888; 20020083316; 20020107023; 20020120874; 20020133534; 20020145978; 20020176399; 20020188656; 20020191573; 20020196789; 20020198994; 20030048749; 20030076837; 20030084020; 20030095504; 20030161268; 20030163729; 20030165117; 20030179742; 20030185233; 20030202468; 20030202469; 20030202476; 20030202477; 20030202512; 20030204587; 20030204616; 20030212821; 20030212941; 20030235175; 20040014467; 20040022223; 20040022224; 20040025018; 20040028000; 20040028016; 20040028018; 20040029553; 20040029601; 20040032847; 20040042417; 20040042434; 20040048618; 20040057409; 20040071124; 20040081152; 20040085928; 20040090943; 20040095915; 20040103275; 20040117339; 20040121786; 20040125795; 20040143678; 20040157557; 20040160943; 20040174900; 20040179502; 20040185889; 20040190468; 20040190476; 20040196854; 20040203385; 20040203797; 20040203820; 20040210657; 20040213167; 20040215687; 20040218528; 20040218548; 20040218582; 20040219909; 20040223491; 20040223497; 20040223498; 20040223499; 20040223500; 20040225740; 20040228304; 20040228343; 20040228490; 20040240426; 20040246144; 20040246902; 20040246931; 20040246975; 20040264422; 20040264466; 20050013253; 20050014510; 20050021725; 20050041591; 20050041627; 20050041628; 20050041676; 20050053003; 20050053004; 20050053005; 20050053007; 20050053094; 20050054346; 20050058149; 20050073962; 20050073992; 20050076054; 20050078678; 20050083859; 20050088993; 20050094574; 20050094594; 20050094620; 20050099971; 20050100029; 20050105524; 20050129000; 20050135379; 20050136972; 20050141706; 20050152305; 20050152318; 20050153725; 20050157661; 20050163144; 20050169257; 20050175009; 20050185632; 20050190717; 20050190759; 20050190767; 20050195814; 20050243757; 20050249215; 20050254472; 20050254473; 20050259588; 20050259595; 20050259671; 20050265259; 20050271006; 20050276608; 20050286419; 20060002328; 20060007863; 20060007865; 20060013177; 20060023632; 20060023677; 20060029074; 20060030318; 20060031576; 20060034232; 20060034233; 20060039371; 20060056353; 20060067213; 20060089119; 20060092043; 20060092898; 20060092939; 20060095199; 20060098608; 20060101157; 20060114851; 20060117113; 20060120303; 20060126514; 20060126524; 20060126535; 20060126587; 20060128349; 20060136721; 20060146846; 20060155827; 20060159024; 20060159082; 20060165037; 20060167784; 20060176829; 20060176863; 20060182145; 20060187893; 20060188327; 20060195590; 20060206857; 20060215605; 20060227724; 20060229090; 20060233377; 20060251115; 20060253747; 20060265508; 20060268688; 20060268749; 20060268796; 20060280131; 20060291404; 20060291485; 20060291864; 20070025274; 20070038743; 20070053053; 20070064950; 20070070909; 20070070983; 20070086358; 20070087756; 20070087758; 20070091805; 20070091811; 20070110024; 20070110102; 20070115810; 20070124063; 20070127379; 20070127503; 20070129015; 20070140129; 20070140239; 20070147321; 20070153707; 20070153737; 20070153764; 20070161388; 20070171862; 20070183346; 20070195400; 20070195702; 20070195713; 20070195728; 20070195768; 20070195799; 20070197262; 20070201428; 20070206547; 20070214046; 20070214254; 20070223310; 20070223436; 20070229231; 20070230410; 20070237150; 20070247368; 20070248117; 20070258473; 20070258508; 20070280136; 20070280174; 20070280192; 20070286097; 20070286139; 20070297371; 20070297375; 20070297808; 20080004904; 20080008138; 20080008201; 20080019298; 20080019328; 20080025270; 20080026781; 20080031187; 20080031203; 20080036589; 20080037431; 20080037454; 20080037560; 20080037569; 20080040507; 20080040509; 20080043316; 20080051036; 20080051099; 20080056157; 20080056207; 20080059652; 20080062916; 20080062947; 20080069105; 20080080520; 20080095058; 20080095059; 20080101332; 20080107034; 20080112422; 20080117885; 20080117896; 20080123584; 20080126403; 20080130500; 20080130640; 20080144497; 20080144566; 20080151793; 20080151841; 20080151889; 20080151916; 20080159142; 20080159143; 20080159144; 20080159151; 20080159358; 20080165745; 20080170513; 20080170518; 20080170550; 20080175149; 20080175244; 20080183853; 20080186562; 20080192713; 20080192724; 20080195360; 20080198789; 20080198824; 20080198865; 20080200165; 20080205312; 20080205332; 20080205385; 20080212494; 20080219185; 20080219237; 20080228940; 20080232338; 20080240050; 20080247335; 20080247353; 20080247355; 20080252485; 20080253340; 20080259927; 20080261580; 20080262893; 20080267116; 20080273487; 20080273518; 20080279155; 20080279204; 20080291843; 20080291855; 20080298251; 20080310325; 20080310340; 20080310390; 20080320305; 20090003324; 20090003366; 20090010204; 20090010205; 20090016262; 20090043909; 20090046688; 20090046714; 20090046732; 20090047938; 20090052429; 20090054033; 20090059814; 20090059816; 20090061835; 20090062887; 20090075625; 20090085769; 20090086663; 20090086973; 20090092074; 20090097490; 20090109898; 20090116393; 20090116511; 20090122738; 20090122748; 20090122753; 20090122766; 20090122797; 20090129316; 20090135824; 20090147702; 20090147766; 20090168653; 20090174569; 20090175170; 20090175238; 20090185508; 20090185538; 20090190514; 20090196194; 20090201860; 20090201899; 20090210495; 20090215411; 20090217033; 20090219194; 20090225751; 20090228575; 20090228693; 20090228708; 20090232119; 20090245159; 20090252102; 20090252134; 20090267540; 20090274106; 20090290494; 20090310488; 20090316682; 20090323519; 20100008231; 20100014444; 20100017045; 20100020721; 20100020740; 20100020756; 20100029216; 20100058442; 20100061299; 20100061352;

20100070600; 20100074141; 20100074194; 20100091823;
20100091924; 20100097957; 20100097969; 20100097971;
20100103870; 20100106961; 20100111063; 20100118727;
20100118750; 20100118775; 20100118776; 20100123572;
20100124196; 20100124207; 20100125671; 20100125674;
20100135195; 20100142421; 20100142445; 20100142446;
20100142447; 20100142448; 20100142551; 20100150027;
20100150120; 20100152619; 20100157888; 20100157889;
20100165995; 20100166003; 20100169937; 20100172249;
20100172298; 20100177753; 20100185753; 20100187832;
20100188979; 20100202355; 20100203878; 20100208662;
20100214934; 20100214960; 20100226284; 20100226342;
20100226381; 20100232317; 20100232354; 20100235285;
20100238890; 20100246549; 20100254282; 20100254309;
20100254312; 20100259931; 20100260131; 20100264846;
20100265955; 20100270933; 20100271934; 20100279776;
20100285774; 20100295473; 20100295474; 20100295475;
20100295482; 20100296285; 20100301768; 20100301769;
20100301770; 20100301771; 20100301773; 20100301774;
20100301834; 20100302624; 20100302779; 20100302945;
20100302947; 20100303082; 20100304759; 20100306320;
20100308207; 20100309912; 20100316033; 20100317420;
20100329274; 20110001436; 20110001438; 20110002243;
20110004513; 20110006913; 20110007687; 20110010446;
20110019540; 20110019652; 20110019678; 20110047230;
20110050457; 20110051662; 20110051702; 20110058545;
20110066297; 20110072156; 20110075578; 20110078461;
20110078775; 20110080853; 20110085530; 20110090787;
20110099153; 20110099189; 20110099490; 20110099611;
20110107225; 20110107420; 20110107431; 20110110273;
20110116366; 20110116376; 20110117852; 20110119637;
20110125765; 20110128884; 20110131180; 20110133924;
20110141888; 20110142057; 20110149756; 20110149849;
20110149973; 20110158153; 20110164527; 20110164546;
20110185047; 20110187527; 20110188378; 20110188653;
20110200026; 20110204720; 20110205925; 20110211472;
20110211534; 20110216656; 20110216667; 20110222435;
20110223937; 20110225311; 20110225312; 20110228696;
20110228777; 20110228788; 20110231573; 20110231862;
20110235550; 20110235573; 20110238751; 20110239158;
20110255399; 20110255479; 20110261799; 20110267981;
20110273568; 20110280156; 20110280246; 20110289320;
20110302635; 20110305136; 20110314504; 20120005201;
20120008527; 20120014309; 20120023171; 20120026877;
20120030150; 20120039186; 20120039190; 20120044864;
20120051339; 20120057515; 20120063436; 20120091315;
20120092984; 20120092993; 20120093134; 20120106428;
20120113807; 20120113863; 20120113896; 20120113901;
20120113986; 20120116559; 20120117208; 20120117213;
20120117268; 20120117438; 20120127977; 20120134287;
20120134361; 20120134548; 20120135723; 20120154633;
20120155260; 20120155276; 20120155284; 20120155329;
20120155397; 20120155463; 20120155475; 20120155511;
20120158933; 20120176931; 20120176941; 20120182867;
20120188968; 20120196636; 20120197988; 20120207294;
20120208592; 20120209808; 20120209910; 20120210233;
20120213124; 20120224587; 20120224743; 20120230204;
20120230222; 20120230370; 20120233326; 20120233485;
20120235579; 20120236724; 20120242501; 20120243408;
20120243621; 20120250575; 20120254338; 20120257624;
20120258777; 20120272295; 20120275642; 20120277893;
20120280908; 20120282905; 20120282911; 20120284012;
20120284122; 20120284339; 20120284593; 20120287941;
20120294152; 20120300758; 20120307624; 20120307629;
20120307652; 20120307653; 20120307676; 20120307752;
20120307825; 20120309417; 20120311334; 20120314660;
20120320768; 20120320781; 20120320790; 20120320923;
20120324273; 20120327792; 20120331316; 20130010590;
20130010615; 20130010798; 20130012220; 20130013806;
20130013809; 20130016612; 20130016757; 20130016758;
20130016759; 20130018993; 20130019005; 20130022042;
20130022046; 20130022053; 20130022083; 20130022084;
20130024149; 20130024560; 20130028095; 20130028103;
20130028104; 20130028140; 20130028143; 20130028295;
20130031253; 20130033987; 20130034031; 20130042301;
20130045759; 20130051250; 20130055383; 20130059585;
20130064072; 20130064102; 20130064137; 20130067063;
20130069780; 20130070597; 20130070751; 20130079152;
20130080307; 20130083658; 20130083688; 20130086601;
20130088999; 20130089011; 20130094366; 20130094398;
20130094536; 20130094537; 20130100872; 20130100942;
20130103765; 20130107726; 20130107758; 20130111038;
20130121176; 20130121331; 20130121335; 20130122807;
20130124883; 20130128726; 20130128773; 20130136416;
20130138792; 20130143529; 20130143535; 20130148573;
20130151563; 20130159479; 20130159548; 20130159550;
20130169838; 20130170393; 20130170394; 20130177025;
20130178718; 20130182566; 20130183952; 20130188471;
20130188492; 20130188513; 20130188562; 20130191688;
20130194970; 20130195095; 20130201316; 20130201869;
20130201891; 20130208583; 20130208714; 20130215739;
20130215942; 20130219045; 20130219046; 20130219478;
20130223218; 20130223225; 20130223229; 20130223237;
20130223275; 20130223447; 20130227055; 20130227114;
20130227336; 20130235799; 20130242929; 20130242956;
20130250754; 20130250795; 20130250808; 20130250809;
20130250811; 20130250866; 20130250945; 20130250953;
20130250969; 20130251053; 20130251054; 20130259096;
20130275513; 20130279365; 20130279540; 20130283347;
20130283360; 20130286892; 20130286942; 20130290560;
20130290843; 20130290985; 20130301405; 20130301584;
20130308495; 20130310896; 20130311661; 20130315077;
20130315078; 20130315102; 20130315131; 20130322294;
20130332010; 20130332011; 20130332025; 20130336199;
20130336289; 20130336316; 20130342355; 20140006411;
20140006893; 20140016643; 20140022906; 20140029432;
20140029445; 20140029470; 20140029603; 20140029610;
20140029624; 20140036722; 20140036727; 20140036908;
20140036912; 20140036925; 20140046882; 20140055284;
20140064172; 20140068105; 20140071826; 20140071837;
20140080492; 20140081793; 20140086041; 20140092752;
20140092753; 20140092769; 20140092905; 20140095864;
20140105015; 20140105027; 20140105033; 20140105211;
20140108643; 20140114549; 20140114554; 20140114555;
20140121476; 20140122673; 20140123227; 20140123278;
20140126348; 20140126354; 20140126419; 20140126423;
20140126426; 20140126431; 20140126610; 20140129734;
20140129876; 20140136881; 20140161015; 20140167912;
20140171021; 20140185499; 20140195668; 20140219078;
20140219103; 20140219114; 20140219133; 20140222725;
20140222726; 20140222727; 20140222728; 20140222729;
20140222730; 20140222731; 20140222748; 20140222975;
20140222983; 20140222996; 20140222997; 20140222998;
20140223155; 20140233426; 20140245055; 20140247726;
20140247752; 20140247804; 20140254433; 20140269402;
20140269413; 20140269487; 20140269514; 20140269592;
20140269759; 20140273920; 20140278475; 20140281670;
20140285090; 20140285095; 20140286301; 20140286377;
20140293605; 20140293787; 20140297206; 20140302773;
20140302774; 20140304427; 20140307614; 20140310243;
20140310349; 20140314096; 20140320021; 20140321325;
20140324596; 20140324833; 20140328346; 20140330947;
20140330985; 20140333990; 20140335952; 20140341227;
20140349684; 20140355425; 20140357295; 20140357312;

20140362847; 20140369550; 20140372577; 20140372585; 20140376361; 20140376407; 20140376427; 20140379896; 20140379900; 20150002336; 20150003251; 20150003292; 20150003293; 20150003428; 20150009829; 20150010153; 20150016688; 20150023174; 20150023186; 20150023205; 20150023363; 20150023369; 20150026268; 20150030033; 20150031400; 20150043384; 20150043519; 20150046696; 20150055650; 20150061511; 20150063365; 20150066650; 20150071295; 20150072728; 20150078182; 20150081840; 20150089081; 20150092529; 20150092538; 20150092560; 20150092661; 20150103813; 20150109962; 20150110104; 20150111591; 20150117221; 20150117305; 20150138977; 20150139034; 20150139231; 20150146603; 20150149469; 20150154239; 20150155637; 20150156199; 20150172953; 20150180772; 20150180800; 20150186642; 20150186775; 20150186799; 20150188754; 20150188801; 20150188934; 20150188935; 20150188949; 20150193693; 20150193694; 20150193695; 20150193696; 20150193697; 20150195126; 20150195136; 20150195144; 20150195145; 20150195146; 20150195149; 20150195171; 20150195184; 20150195185; 20150195192; 20150195212; 20150195216; 20150195296; 20150195692; 20150200713; 20150200714; 20150200738; 20150200810; 20150200846; 20150201415; 20150207677; 20150207724; 20150207916; 20150208316; 20150208318; 20150237130; 20150237556; 20150237559; 20150244481; 20150244484; 20150244623; 20150244648; 20150245179; 20150245203; 20150245231; 20150245412; 20150263863; 20150264626; 20150264627; 20150271080; 20150304209; 20150311948; 20150316926; 20150318891; 20150318892; 20150319076; 20150319077; 20150319084; 20150324582; 20150326450; 20150326598; 20150326609; 20150327260; 20150327261; 20150330869; 20150331652; 20150332165; 20150333997; 20150334031; 20150334123; 20150334209; 20150341140; 20150341874; 20150350018; 20150350245; 20150351084; 20150359020; 20150363981; 20150372903; 20150373700; 20150381489; 20150382275; 20150382278; 20160006573; 20160020864; 20160020967; 20160020979; 20160020987; 20160020988; 20160020997; 20160021006; 20160021009; 20160021011; 20160021013; 20160021014; 20160021017; 20160021018; 20160021126; 20160021596; 20160021647; 20160026542; 20160027054; 20160028609; 20160028750; 20160028751; 20160028752; 20160028753; 20160028754; 20160028755; 20160028762; 20160028763; 20160028764; 20160029182; 20160044035; 20160057116; 20160072699; 20160073271; 20160080030; 20160081102; 20160094398; 20160099770; 20160100316; 20160100417; 20160105356; 20160105523; 20160112929; 20160116819; 20160119739; 20160127257; 20160127942; 20160127978; 20160132397; 20160134161; 20160134468; 20160134514; 20160134516; 20160134539; 20160142248; 20160142901; 20160149805; 20160149856; 20160150501; 20160156450; 20160182121; 20160182170; 20160183351; 20160191487; 20160191488; 20160192274; 20160197800; 20160197831; 20160198244; 20160212729; 20160212740; 20160224951; 20160248661; 20160249254; 20160269275; 20160269976; 20160277201; 20160277874; 20160294493; 20160302195; 20160308793; 20160309392; 20160315848; 20160323012; 20160323113; 20160330107; 20160345236; 20160359592; 20160359677; 20160366553; 20160380776; 20170019970; 20170034041; 20170034760; 20170041246; 20170041822; 20170041868; 20170048783; 20170048853; 20170054644; 20170070942; 20170078170; 20170078400; 20170086279; 20170093687; 20170099226; 20170099567; 20170099684; 20170103213; 20170104727; 20170111271; 20170135021; 20170149639; 20170149651; 20170149882; 20170149901; 20170150418; 20170155566; 20170156118; 20170161609; 20170163527; 20170164263; 20170164264; 20170180262; 20170181053; 20170187661; 20170195826; 20170206512; 20170237669; 20170238197; 20170244838; 20170250856; 20170250898; 20170251246; 20170251387; 20170259942; 20170272144; 20170272315; 20170272978; 20170273003; 20170278198; 20170284839; 20170289225; 20170289812; 20170294988; 20170295081; 20170295455; 20170295609; 20170300693; 20170303187; 20170310553; 20170311423; 20170317713; 20170317906; 20170318453; 20170324618; 20170325127; 20170331899; 20170332439; 20170339099; 20170364409; 20170366456; 20170373775; 20180006833; 20180007687; 20180013573; 20180014241; 20180024091; 20180026891; 20180027473; 20180049043; 20180068358; 20180083862; 20180103094; 20180109492; 20180109495; 20180109496; 20180109533; 20180109551; 20180109954; 20180124812; 20180131455; 20180145841; 20180145876; 20180184269; WO 2012/078565, WO 2012/116489.

Two distinct types of ubiquitous wireless data communication networks have developed: cellular telephone networks having a maximum range of about 20-50 miles line of sight or 3 miles in hilly terrain, and short-range local-area computer networks (wireless local-area networks or WLANs) having a maximum range of about 0.2-0.5 miles (~1000-2500 feet IEEE-802.11n, 2.4 GHz) outdoors line of sight. IEEE 802.11ah is a wireless networking protocol published in 2017 (Wi-Fi HaLow) as an amendment of the IEEE 802.11-2007 wireless networking standard. It uses 900 MHz license exempt bands to provide extended range Wi-Fi networks, compared to conventional Wi-Fi networks operating in the 2.4 GHz and 5 GHz bands. It also benefits from lower energy consumption, allowing the creation of large groups of stations or sensors that cooperate to share signals, supporting the concept of the Internet of Things (IoT). en.wikipedia.org/wiki/IEEE 802.11ah. A benefit of 802.11ah is extended range, making it useful for rural communications and offloading cell phone tower traffic. The other purpose of the protocol is to allow low rate 802.11 wireless stations to be used in the sub-gigahertz spectrum. The protocol is one of the IEEE 802.11 technologies which is the most different from the LAN model, especially concerning medium contention. A prominent aspect of 802.11ah is the behavior of stations that are grouped to minimize contention on the air media, use relay to extend their reach, employ predefined wake/doze periods, are still able to send data at high speed under some negotiated conditions and use sectored antennas. It uses the 802.11a/g specification that is down sampled to provide 26 channels, each of them able to provide 100 kbit/s throughput. It can cover a one-kilometer radius. It aims at providing connectivity to thousands of devices under an access point. The protocol supports machine to machine (M2M) markets, like smart metering.

The cellular infrastructure for wireless telephony involves long-distance communication between mobile phones and central base-stations, where the base stations are typically linked to cell sites, connecting to the public switched telephone network and the Internet. The radio band for these long-range wireless networks is typically a regulated, licensed band, and the network is managed to combine both broad bandwidth (~5-20 MHz) and many simultaneous users. This is contrasted with a short-range wireless computer network, which may link multiple users to a central router or hub, which router may itself have a wired connection to the Internet. A key example is WiFi, which is managed according to the IEEE-802.11x communications standards, with an aggregate data rate theoretically over 1 gigabit per second (802.11ac) and a range that is typically much less than 100 m. Other known standard examples are known by the terms Bluetooth and ZigBee. The radio band for a WLAN is typically an unlicensed band, such as one of the ISM bands (industrial, scientific, and medical), or more recently, a whitespace band formerly occupied by terrestrial analog television (WSLAN). One implication of such an unlicensed band is the unpredictable presence of significant interference due to other classes of users, which tends to limit either the range, or the bandwidth, or both. For such local area networks, a short range (low power and high modulation rates) becomes advantageous for high rates of spatial band reuse and acceptable levels of interference.

A flooding-based protocol is disclosed in U.S. Provisional Patent Application No. 62/628,717, filed Feb. 9, 2018, expressly incorporated herein by reference in its entirety. See, Tanenbaum, Andrew S.; Wetherall, David J. (2010-03-23). Computer Networks (5th ed.). Pearson Education. p. 368-370. ISBN 978-0-13-212695-3.

Rahman, Ashikur; Olesinski, Wlodek; Gburzynski, Pawel (2004). "Controlled Flooding in Wireless Ad-hoc Networks" (PDF). International Workshop on Wireless Ad-Hoc Networks. Edmonton, Alberta, Canada: University of Alberta, Department of Computing Science. Archived (PDF) from the original on 2017-02-10. Retrieved 2015-10-15.

www.cs.cornell.edu/projects/quicksilver/ricochet.html

Thomas Zahn, Greg O'Shea and Antony Rowstron, "An Empirical Study of Flooding in Mesh Networks", Microsoft Research, Cambridge, UK, April 2009 Technical Report MSR-TR-2009-37

A. Iwata, C.-C. Chiang, G. Pei, M. Gerla, and T.-W. Chen. Scalable Routing Strategies for Ad Hoc Wireless Networks. In IEEE Journal on Selected Areas in Communications, Special Issue on Ad-Hoc Networks, pp. 1369-1379, August 1999.

A. Qayyum, L. Viennot, and A. Laouiti. Multipoint relaying: An efficient technique for flooding in mobile wireless networks. Technical Report 3898, INRIA—Rapport de recherche, 2000.

A. Savvides, C. C. Han and M. B. Srivastava. Dynamic Fine-Grained Localization in Ad-Hoc Networks of Sensors. In Proceedings of MOBICOM'01, July 2001.

B. Das and V. Bharghavan. Routing in Ad hoc Networks using Minimum Connected Dominating Sets (MCDS), Proceedings of 1997 IEEE International Conference on Communications (ICC'97), 1997.

Brad Williams, Tracy Camp. Comparison of broadcasting techniques for mobile ad hoc networks. Proceedings of the third ACM international symposium on Mobile ad hoc networking & computing, June 2002

C. Ho, K. Obraczka, G. Tsudik, and K. Viswanath. Flooding for reliable multicast in multi-hop ad hoc networks. In Proceedings of the International Workshop on Discrete Algorithms and Methods for Mobile Computing and Communication (DIALM), pages 64-71, 1999.

C. E. Perkins and P. Bhagwat. Highly Dynamic Destination Sequenced Distance Vector Routing (DSDV) for mobile computers. In proceedings of ACM SIGCOMM, pp. 234-244, 1994.

C. E. Perkins. Ad hoc on-demand distance vector routing, Internet Draft, Internet Engineering Task Force, work in progress, December 1997.

C.-H. Toh. A novel distributed routing protocol to support ad-hoc mobile computing, Proceeding of 15th IEEE Annual International Phoenix Conference on Computer Communications, pp. 480-486, 1996.

C-C. Chiang, H. Wu, W. Liu and M. Gerla. Routing in Clustered, Multihop, Mobile Wireless Networks with Fading Channel, The IEEE International Conference on Networks, pages 197-211, Singapore, April 1997.

D. Niculescu and B. Nath. Ad Hoc Positioning System (APS) using AoA. INFOCOM'03, San Francisco, Calif.

D. B. Johnson and D. A. Maltz. Dynamic Source Routing in mobile ad hoc networks, Mobile Computing, (Ed. T. Imielinski and H. Korth), Kluwer Academic Publishers, 1996.

E. Pagani and G. P. Rossi. Reliable broadcast in mobile multi-hop packet networks., Proceedings of the third annual ACM/IEEE International Conference on mobile computing and networking (MOBICOM'97), pp. 34-42, 1997.

G. Dommety and R. Jain. Potential networking applications of global positioning systems (GPS). Tech. Rep. TR-24, CS Dept., The Ohio State University, April 1996.

H. Lim and C. Kim. Multicast tree construction and flooding in wireless ad hoc networks. In Proceedings of the ACM International Workshop on Modeling, Analysis and Simulation of Wireless and Mobile Systems (MSWIM), 2000.

Haas, Halpern, Li. Gossip based Ad Hoc Routing. In IEEE INFOCOM, June 2002.

I. Chlamtac and O. Weinstein. The wave expansion approach to broadcasting in multi-hop radio networks. IEEE Trans. Commun., vol. 39, pp. 426-433, March 1991.

I. Gaber and Y. Mansour. Broadcast in radio networks. In Proc. 6th Annu. ACM-SIAM Symp. Discrete Algorithms, San Francisco, Calif., January 1995, pp. 577-585.

I. Stojmenovic, M. Seddigh, and J. Zunic. Internal node based broadcasting in wireless networks. In Proceedings of the Hawaii International Conference on System Sciences (HICSS), 2001.

J. Jetcheva, Y. Hu, D. Maltz, and D. Johnson. A simple protocol for multicast and broadcast in mobile ad hoc networks. Internet Draft: draft-ietf-manet-simple-mbcast-01.txt, July 2001.

J. Li, C. Blake, D. S. J. De Couto, H. I. Lee, and R. Morris. Capacity of ad hoc wireless networks. In Proc. Seventh Annual ACM/IEEE International Conference on Mobile Computing and Networking (MobiCom), 2001.

J. Sucec and I. Marsic. An efficient distributed network-wide broadcast algorithm for mobile ad hoc networks. CAIP Technical Report 248—Rutgers University, September 2000.

J. Wu and H. Li. On calculating connected dominating sets for efficient routing in ad hoc wireless networks. In Proceedings of the International Workshop on Discrete Algorithms and methods for Mobile Computing and Communication (DIAL-M), pages 7-14, 1999.

J. P. Macker and M. S. Corson. Mobile Ad hoc networking and IETF Mobile computing and communication review, 2(1):9-14, January 1998.

Jie Wu and Fei Dai. Broadcasting in Ad Hoc Networks Based on Self-Pruning. In Proceedings of IEEE INFOCOM 2003, San Francisco, Calif.

Kershner, R. The Number of Circles Covering a Set. Amer. J. Math. 61, 665-671, 1939.

M. Sanchez. Mobility models. www.disca.upv.es/misan/mobmodel.htm, 1998.

M. Sun and T. H. Lai. Location Aided Broadcast in Wireless Ad Hoc Network Systems. Proc. IEEE WCNC 2002, pp. 597-602, March 2002.

M. K. Denko and W. Goddard. Limited Flooding in Mobile Ad hoc Networks. In proceedings of the 14th MSc/PhD Annual Conference in Computer Science, Golden Gate, South Africa, pp. 21-24, June 1999.

M. K. Denko and W. Goddard. Routing Algorithms in Mobile Ad hoc Networks using Clustering Proceedings of 1998 MSc/PhD annual Conference, University of Stellenbosch, South Africa, pp. 6-18, July 1998.

M. K. Denko and W. Goddard: Clustering in Mobile Ad hoc Networks. In proceedings of the 5th International Conference in Communication systems (AFRICOM 2001), Cape Town, South Africa, May 2001.

M. M. Zonoozi and P. Dassanayake. User mobility modeling and characterisation of mobility patterns. IEEE Journal of Selected Areas in Communications, 15(7):1239-1252, September 1997.

M. S. Corson and A. Ephremides. A highly adaptive distributed routing algorithm for mobile wireless networks. ACM/Baltzer Wireless Networks Journal, 1(1):61-81, 1995.

N. Alon, A. Bar-Noy, N. Linial, and D. Peleg. A lower bound for radio broadcast. J. Comput. Syst. Sci., vol. 43, pp. 290-298, October 1991.

O. Lesser, R. Rom. Routing by controlled flooding in communication networks in proceeding of IEEE INFOCOM'90, (San Francisco, Calif.), pp. 910-917, June 1990.

P. Bahl and V. N. Padmanabhan. RADAR: An In-Building RF-Based User Location and Tracking System. In Proceedings of the IEEE INFOCOM'00.

P. Krishna, M. Chatterjee, N. H. Vaidya and D. K. Pradhan. A Cluster-based Approach for Routing in Ad hoc Networks. In proceedings of Second USENIX Symposium on mobile and Location Independent Computing, pp. 1-10, January 1996.

R. Bagrodia and R. A. Meyer. PARSEC User Manual, Release 1.0, UCLA Parallel Computing Laboratory, University of California, Los Angeles, February 1998.

R. Dube. Signal Stability based adaptive routing for Ad Hoc Mobile Networks. IEEE Personal Communications, pp. 36-45, February 1997.

S. Basagni, I. Chlamtac, V. R. Syrotiuk and B. A. Woodward. A Distance Routing Effect Algorithm for Mobility (DREAM), Proceedings of the fourth Annual mobile computing and networking, October 1998.

S. Guha and S. Khuller. Approximation algorithms for connected dominating sets. In Proceedings of European Symposium on Algorithms (ESA), 1996.

S. Murthy and J. J. Garcia-Luna-Aceves. An Efficient Routing Protocol for Wireless Networks. ACM Mobile Networks and Applications, Special Issue on Routing in Mobile Communication Networks, 1(1):183-197, October 1996.

S. Y. Ni et al. The Broadcast Storm Problem in a Mobile Ad Hoc Network. ACM MOBICOM, pp. 151-162, August' 1999.

T. Camp, J. Boleng, and V. Davies. A Survey of Mobility Models for Ad Hoc Network Research. Wireless Communication & Mobile Computing (WCMC), vol. 2, no. 5, pp. 483-502, 2002.

T. S. Rappaport. Wireless Communications: Principles and Practices. Prentice Hall, October 1995.

Tian He, Chengdu Huang, B. M. Blum, John A. Stankovic, and Tarek F. Abdelzaher. Range-Free Localization Schemes in Large Scale Sensor Networks. Ninth Annual International Conference on Mobile Computing and Networking (MobiCom 2003), San Diego, Calif., September 2003. To appear.

V. D. Park and M. S. Corson. A highly adaptive distributed routing algorithm for mobile wireless networks, Proceedings of 1997 IEEE Conference on Computer Communications (INFOCOM'97), April 1997.

W. Peng and X. Lu. AHBP: An efficient broadcast protocol for mobile ad hoc networks. Journal of Science and Technology—Beijing, China, 2002.

W. Peng and X. Lu. On the reduction of broadcast redundancy in mobile ad hoc networks. In Proceedings of MOBIHOC, 2000.

Y. Azar, J. Naor, R. Rom. Routing Strategies in Fast Networks IEEE Transactions on Computers, 45(2):165-173, 1996.

Y-B. Ko, N. H. Vaidya. Location Aided Routing for mobile ad hoc networks Proceedings of the fourth Annual mobile computing and networking, October 1998.

Z. J. Haas and M. Pearlman. Zone Routing Protocol (ZRP) for ad hoc networks, Internet Draft, Internet Engineering Task Force, work in progress, December 1997.

people.cs.clemson.edu/~goddard/papers/limitedFlooding.pdf

Mesh wireless sensor networks: Choosing the appropriate technology, Industrial Embedded Systems—Jul. 21, 2009, industrial.embedded-computing.com/article-id/?4098=, describes mesh wireless sensor networks (WSN).

Vamsi K Paruchuria, Arjan Durresib, Raj Jain, "Optimized Flooding Protocol for Ad hoc Networks", ai2-s2-pdfs.s3.amazonaws.com/4871/fddbldefd8b202c8e4d3103d691079996d4e.pdf.

SUMMARY OF THE INVENTION

In a wireless mesh network, it is often required to unicast a packet from a source of the packet to a specified destination, over multiple hops. An example application is for 1:1 private chatting (texting). Another use is for accessing a server or an Internet gateway to the wireless mesh network. While there have been a number of inventions and academic papers on this basic problem of routing (see supra), prior work, including works referenced above, utilize control packets to first discover routes, either proactively, or reactively (on-demand), or in a hybrid scheme. Control packets include "link-state advertisements/updates", "route request/response", etc. See, en.wikipedia.org/wiki/List_of_ad_hoc_routing_protocols.

The present technology provides a zero-control-packet mesh routing protocol, called VINE™. The lack of requirement for control packets means better scalability, longer battery life, and less vulnerability to control attacks.

The basic idea behind the VINE™ protocol is to use data packets themselves to build the routing state, referred to hereafter as gradient state (as the collection of node states forms a "gradient" toward the destination), which is then used for forwarding other data packets. Specifically, the gradient state indicates, for each destination, the number of hops to that destination via each of its neighbors. Every data packet contains information, such as its source and number of hops, sending neighbor, etc. A node receiving the packet uses that information to create a gradient state for those nodes. Packets are forwarded if there is gradient state for the destination that is fresh enough, and the gradient hops to the destination through some neighbor is less than or equal to the current node's hops to the destination. Thus, packets are forwarded along non-increasing gradients (like "water flowing downhill"), until the destination is reached. If there is no such gradient state, or if the time to live ("TTL") of the packet becomes zero, the packet is broadcast.

The present technology is particularly appropriate for a wireless mesh network in which the bandwidth is highly constrained, so that the use of routing control packets would be prohibitively expensive, according to the constraints of the network.

It is therefore an object to provide a mesh network communication protocol for communicating between respective mesh network nodes, comprising:
receiving a data packet from a current sender by a recipient, the data packet defining:
an identity of the current sender,
an identity of a prior sender from which the current sender received the data packet,
a hop count of hops previously traversed by the data packet,
an identity of the final destination,
an identity of a target recipient, and
a sequence identifier; updating a forwarding table to:
mark the current sender as being reachable in one hop, and
the prior sender as being reachable in two hops via the current sender as next hop;
determining whether to rebroadcast by the recipient, if and only if the sequence identifier is not present in a list of prior sequence identifiers, the identity of the target recipient in the packet matches the identity of the recipient, and the identity of the final destination is not the recipient; and
selectively rebroadcasting the data packet by the recipient in dependence on said determining, modified by:
a replacement of the identity of the current sender with an identity of the recipient,
a replacement of the identity of the prior sender with the identity of the current sender,
a decrement of the time-to-live,
a replacement of the identity of the target recipient with an identity of a next hop from the forwarding table if present, and
an increment of the hop count,
wherein the data packet is not forwarded if the time-to-live is zero.

The data packet received from the current sender preferably comprises a data payload.

The protocol may further comprise updating the forwarding table to mark the originator of the data packet as being reachable in one plus the hop count, via the current sender as the next hop.

The data packet received from the current sender may further define a time-to-live. The forwarding table may also include a timestamp which defines a time of reception of a data packet, which permits determining an age of the information in the forwarding table. A time at which the data packet was received from the current sender may be stored in the forwarding table as a timestamp. The selectively rebroadcasting may be further dependent on an elapsed time with respect to the timestamp.

The protocol may further comprise decrementing the time-to-live stored in the forwarding table. The protocol may selectively rebroadcast further dependent on whether the decremented time-to-live stored in the forwarding table has expired.

The selective rebroadcasting may be further dependent on whether an entry for the final destination is present in the forwarding table.

It is another object to provide a mesh network communication protocol for communicating between respective mesh network nodes, comprising: receiving a data packet from a current sender by a recipient, the data packet defining: an identity of the current sender, an identity of a prior sender from which the current sender received the data packet, a hop count of hops previously traversed by the data packet, an identity of a target recipient, an identity of a final destination, and a sequence identifier; updating a forwarding table to mark the current sender as being reachable in one hop, and the prior sender as being reachable in two hops via the current sender as next hop; determining whether to rebroadcast by the recipient, if and only if the sequence identifier is not present in a list of prior sequence identifiers, the identity of the target recipient matches an identity of the recipient, and the identity of the final destination is not the identity of the recipient; and selectively rebroadcasting the data packet by the recipient in dependence on said determining, modified by: a replacement of the identity of the current sender with the identity of the recipient, a replacement of the identity of the prior sender with the identity of the current sender, a replacement of the identity of the target recipient with an identity of a next hop from the forwarding table if present, and an increment of the hop count. The data packet received from the current sender may further comprise a data payload.

It is also an object to provide a method of operating a node of a mesh network, comprising: receiving a data packet, the data packet defining: an identity of a current sender, an identity of a prior sender from which the current sender received the data packet, a hop count of hops previously traversed by the data packet, an identity of a target recipient, an identity of a final destination, and a sequence identifier; updating a forwarding table to mark the current sender as being reachable in one hop, and the prior sender as being reachable in two hops via the current sender as next hop; determining whether to rebroadcast data contained in the data packet, if and only if: the sequence identifier is not present in a list of prior sequence identifiers, the identity of the target recipient matches a node identifier, and the identity of the final destination is not the node identifier; and selectively rebroadcasting the data of the data packet in dependence on said determining, having a packet header modified from a packet header of the data packet by: a replacement of the identity of the current sender with the node identifier, a replacement of the identity of the prior sender with the identity of the current sender, a replacement of the identity of the target recipient with an identity of a next hop from the forwarding table if present, and an increment of the hop count.

It is further an object to provide a method of operating a node of a mesh network, comprising: receiving a data packet, the data packet defining: an identity of a current sender, an identity of a prior sender from which the current sender received the data packet, an identity of a target recipient, and a sequence identifier; updating a forwarding table to mark the current sender as being reachable in one hop, and the prior sender as being reachable in two hops via the current sender as next hop; determining whether to rebroadcast data contained in the data packet, based on at least whether: the sequence identifier is not present in a list of prior sequence identifiers, and the identity of the target recipient matches a node identifier; and selectively rebroadcasting a modified data packet in dependence on said determining, modified by: a replacement of the identity of the current sender with the node identifier, a replacement of the identity of the prior sender with the identity of the current sender, and a replacement of the identity of the target recipient with an identity of a next hop from the forwarding table if present. The data packet may further define a hop count of hops previously traversed by the data packet; and an identity of the final destination. The determining may comprise determining whether to rebroadcast data contained in the data packet, if and only if: the sequence identifier is not present in a list of prior sequence identifiers, the identity of the target recipient matches a node identifier, and the identity of the final destination is not the node identifier. The selectively rebroadcasting may comprise selectively rebroadcasting the data of the packet data having the packet header further modified from the packet header of the data packet by an increment of the hop count.

The protocol may further comprise updating the forwarding table to mark the originator of the data packet as being reachable in one plus the hop count, via the current sender as the next hop. The timestamp at which the data packet was received from the current sender may be stored in the forwarding table. The selectively rebroadcasting may be further dependent on whether the timestamp stored in the forwarding table has expired with respect to a clock. The selectively rebroadcasting may be further dependent on whether the next hop is present in the forwarding table. The data packet may contain a time-to-live that is decremented by the recipient.

The protocol may further comprise, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, rebroadcasting the modified data packet. Alternately, the protocol may further comprise, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively rebroadcasting the data packet by the recipient in dependence on said determining, modified by: a replacement of the identity of the current sender with the identity of the recipient, a replacement of the identity of the prior sender with the identity of the current sender, a replacement of the identity of the target recipient with an identity of an alternate next hop from the forwarding table if present, and an increment of the hop count.

It is a still further object to provide a mesh network communication node, configured for communication with other mesh network nodes, comprising: a memory configured to store an identifier of the mesh network communication node and a forwarding table; a radio frequency transceiver configured to receive a data packet from a current sender, the data packet defining: an identity of the current sender, an identity of a prior sender from which the current sender received the data packet, an identity of a final destination for the data packet, a hop count of hops previously traversed by the data packet, an identity of a target recipient, and a sequence identifier; at least one processor configured to: update the forwarding table to mark the current sender as being reachable in one hop, and the prior sender as being reachable in two hops via the current sender as next hop; determine whether to rebroadcast the data packet, if and only if the sequence identifier is not present in a list of prior sequence identifiers and the identity of the final destination is not the identifier of the mesh network communication node; modify the data packet by: a replacement of the identity of the current sender with the identity of the mesh network communication node, a replacement of the identity of the prior sender with the identity of the current sender, a replacement of the identity of the target recipient with an identity of a next hop from the forwarding table if present, and an increment of the hop count; and selectively control a rebroadcast of the modified data packet through the radio frequency transceiver, in dependence on the determination. The data packet received from the current sender further may comprise a data payload.

The at least one processor may be further configured to update the forwarding table to mark the originator of the data packet as being reachable in one plus the hop count, via the current sender as the next hop; and/or to store a timestamp representing a time that the data packet is received in the forwarding table; and/or determine expiry of the stored timestamp with respect to a clock.

The selectively control of the rebroadcast may be further dependent on whether the next hop is present in the forwarding table.

The data packet contains a time-to-live, and the at least one processor is further configured to decrement the time-to-live. The at least one processor may be further configured to selectively control a rebroadcast of the modified data packet through the radio frequency transceiver further in dependence on whether the time-to-live has reached zero. The at least one processor may be further configured to, in conjunction with selectively controlling the rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively control the rebroadcast of the modified data packet. The at least one processor may be further configured to, in conjunction with selectively controlling the rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively control the rebroadcast of a data packet modified by: a replacement of the identity of the current sender with an identity of the mesh network communication node, a replacement of the identity of the prior sender with the identity of the current sender, a replacement of the identity of the target recipient with an identity of an alternate next hop from the forwarding table if present, and an increment of the hop count.

The data packet received from the current sender may further define a time-to-live, and the at least one processor is further configured to decrement the time-to-live, and to rebroadcast the data packet if and only if the time-to-live is not zero. A timestamp representing a time of a receipt of a data packet may be stored in the forwarding table to permit determination of age of forwarding table entries. The selective control of the rebroadcast may be further dependent on whether an entry for the final destination is present in the forwarding table. If the final destination is not present in the forwarding table, i.e., a route to the final destination is unknown to the recipient, the recipient may broadcast the data packet, subject to the time-to-live limit and rebroadcast prohibition.

It is a still further object to provide a computer readable memory storing non-transitory instructions for controlling a programmable processor to implement a mesh network communication protocol for communicating between respective mesh network nodes, comprising: instructions for receiving a data packet from a current sender by a recipient, the data packet defining: an identity of the current sender, an identity of a prior sender from which the current sender received the data packet, a hop count of hops previously traversed by the data packet, an identity of a target recipient, an identity of a final destination, and a sequence identifier; instructions for updating a forwarding table to mark the current sender as being reachable in one hop, and the prior sender as being reachable in two hops via the current sender as next hop; instructions for determining whether to rebroadcast by the recipient, if and only if the sequence identifier is not present in a list of prior sequence identifiers and the identity of the final destination is not an identity of the recipient; and instructions for selectively rebroadcasting the data packet by the recipient in dependence on said determining, modified by: a replacement of the identity of the current sender with the identity of the recipient, a replacement of the identity of the prior sender with the identity of the current sender, a replacement of the identity of the target recipient with an identity of a next hop from the forwarding table if present, and an increment of the hop count. The data packet received from the current sender further may comprises a data payload.

The computer readable memory may further comprise instructions for updating the forwarding table to mark the originator of the data packet as being reachable in one plus the hop count, via the current sender as the next hop; and/or instructions for selectively rebroadcasting is further dependent on whether the timestamp has expired with respect to a clock.

A time of receipt of the data from the current sender may define a timestamp, further comprising instructions for storing the timestamp in the forwarding table. The selectively rebroadcasting may be further dependent on whether a predetermined time has elapsed with respect to the timestamp.

The instructions for rebroadcasting may comprise instructions for contingent execution dependent on whether the next hop is present in the forwarding table.

The data packet may contain a time-to-live, further comprising instructions for decrementing the time-to-live by the recipient. Further instructions may be provided for, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, rebroadcasting the modified data packet. Further instructions may be provided for, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively rebroadcasting the data packet by the recipient in dependence on said determining, modified by: a replacement of the identity of the current sender with the identity of the recipient, a replacement of the identity of the prior sender with the identity of the current sender, a replacement of the identity of the target recipient with an identity of an alternate next hop from the forwarding table if present, and an increment of the hop count.

DETAILED DESCRIPTION OF THE PREFERRED EMBODIMENTS

Figure 1:
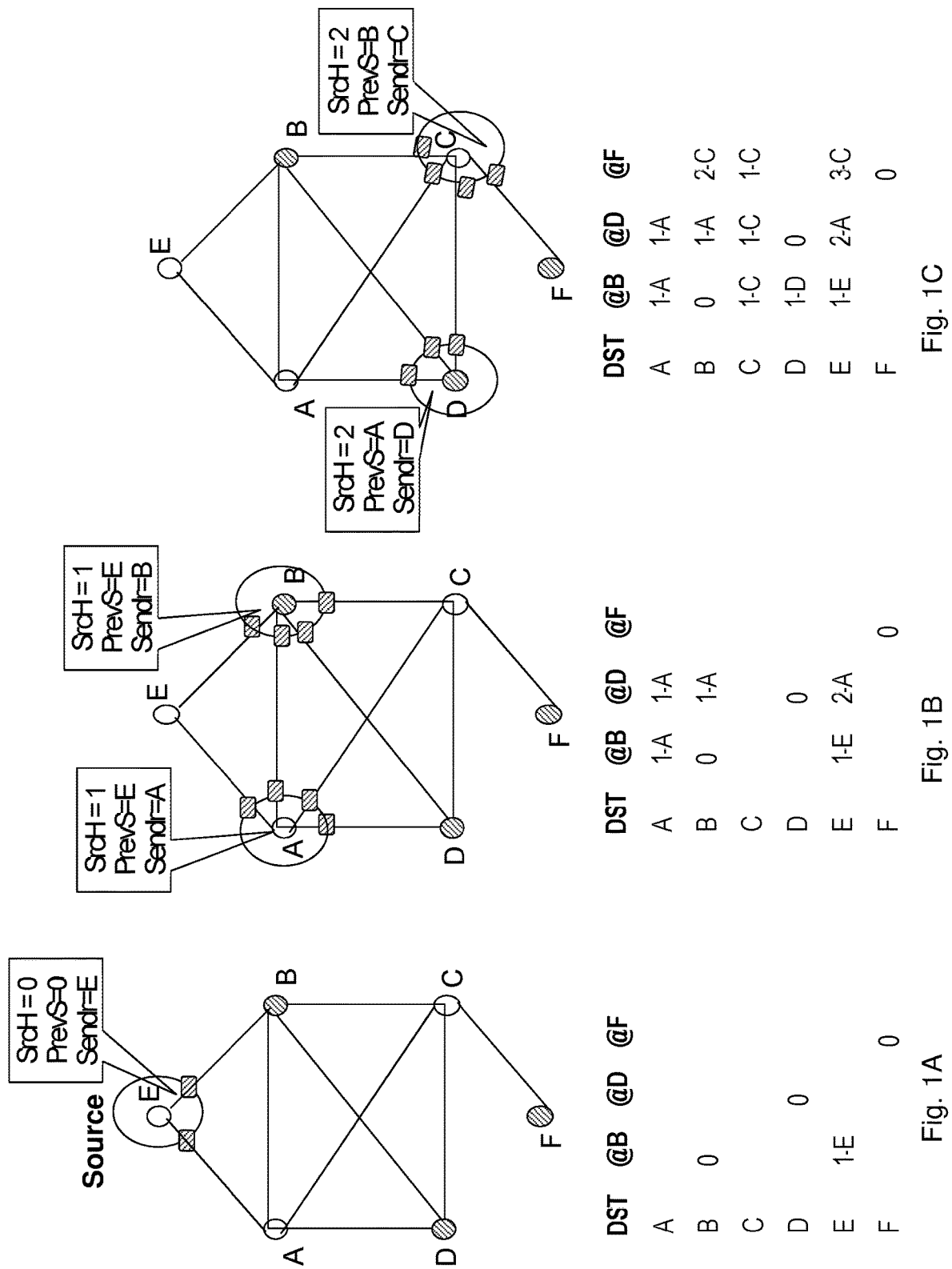
FIGS. 1A-1C show a series of network state diagrams and corresponding state tables.

The VINE™ protocol supports the delivery of a private packet to the destination specified in the packet header.

VINE™ Overview

The basic idea behind the VINE™ protocol is to use data packets themselves to build the routing state (or information), referred to hereafter as gradient state (as the collection of node states forms a "gradient" toward the destination) which is then used for forwarding other data packets. Specifically, the gradient state indicates, for each destination, the best information available about the destination; e.g., the number of hops to that destination via each of its neighbors.

Every data packet contains information, such as its source, the number of hops travelled from the source, sending neighbor, previous sender, etc., using which a node receiving the packet creates gradient state for those nodes. Only data packets are used to create gradient state, and there is no requirement for generation of explicit control packets. The gradient state contains a timestamp that indicates how fresh the information is. State that is older than a configured period is purged.

As is known, it is also possible to include control packets of various types to supplement or enhance the VINE™ protocol, and there is no reason that VINE™ could not or should not exploit routing information gained through alternate means. However, according to the various aspects of the VINE™ protocol, no explicit control packets are required, and each phase of operation can proceed without generation of any such packets.

The gradient state is used to decide, possibly in a distributed manner, whether one or more relay nodes are required, and if so, that set of relay nodes, for the packet. When there is no gradient state for a destination, a packet is relayed by all neighbors. Over time, as traffic flows, an increasingly richer sink tree toward each node is created, abstractly resembling the growth of a "vine" in a grove.

Packets are forwarded if there is gradient state for the destination that is fresh enough (according to a freshness metric, which may be static, dynamically determined, adaptive, geographically dependent, mobility or reliability dependent, etc.), and the gradient hops to the destination through some neighbor is less than or equal to the current node's hops to the destination. Thus, packets are forwarded along non-increasing gradients (like "water flowing downhill"), until the destination is reached.

If there is no such gradient state, the packet is broadcast. With broadcast, there is no specific target neighbor (alternatively, all neighbors are intended receivers). Each receiving neighbor processes the packet as mentioned above.

A packet is never sent back to the neighbor it came from. Every packet contains a sequence number, which is used to ensure that the sequence of broadcasts terminates.

While the lack of control packets means that many packets are flooded, VINE™ engenders a natural balance—packets are only flooded when there is no state, and when there is little state there is generally little data traffic (otherwise there would have been more state) and therefore flooding tends to be affordable; on the other hand, as data traffic increases, the number of nodes with gradient state increases and packets are routed without flooding. Indeed, under such circumstances, if control packets were used, they would need to be flooded as well.

Thus, initially, and after a period of inactivity, the first packet from any node is flooded. Subsequent packets progressively utilize the gradient state set up by previous packets, which increases with the diversity of source-destination pairs in the traffic. Each node independently decides whether to broadcast the packet, that is, have all of its neighbors relay or not.

A packet may alternate between "flooding" and "routing". For example, communication of a packet may start by finding gradient state, and then being forwarded to a neighbor and so on, until it arrives at a node without a gradient state, at which point it may be broadcast. Conversely, a packet may find no gradient state and start being "flooded", and then encounter a node with a gradient state and follow the state "downhill" to the destination. Multiple nodes that have received the broadcast may do this.

The gradient state expires, e.g., after a configured period, and therefore packets that were routed at some point in time may not be at a later point.

The VINE™ method for forwarding packets is referred to as Sender Controlled Relaying (SCR), to emphasize the fact that it is the sender that chooses the next-hop relayer. In SCR, the sender of a packet specifies in the network layer (NL) header the target node that should relay, if applicable.

The Gradient Establishment module is described in detail below, followed by a description of SCR.

used interchangeably. The timestamp is used to age out entries that were created more than a configured time prior.

It is understood, however, that any useful cost function may be used to control the gradient. For example, in a power-constrained, variable power transmit system, the power required to reach a destination may be used as the cost. In other embodiments, an economic system is implemented, so that the cost represents actual or virtual currency units. See, U.S. Patent and Pub. Pat. Appin. Nos. 20180068358; 20180049043; 20180014241; 20170302663; 20170206512; 20160277469; 20160224951; 20150264627; 20150264626; 20150188949; 20150111591; 20130080307; 20120253974; 20110004513; 20100317420; 20100235285; 20080262893; 20070087756; 20060167784; 20030163729; U.S. Pat. Nos. 10,015,720; 9,818,136; 9,794,797; 9,756,549; 9,615,264; 9,311,670; 9,226,182; 8,874,477; 8,774,192; 8,600,830; 8,144,619; and 7,590,589. In still further systems, congestion, communication reliability, communica-

TABLE 1

VINE ™ Routing Header

| Field Number | Name | Length {bits} | Type/Range | Description |
|---|---|---|---|---|
| 1 | Version | 2 | uint 0-15 | The version number of the network layer protocol |
| 2 | Flood mode | 4 | uint 0-15 | Used by Echo to distinguish between full and pruned flood, with override (see remarks) |
| 3 | Sender | 16 | Hash | The (compressed) identifier of the node that transmitted this packet (most previous hop) |
| 4 | Previous sender | 16 | Hash | The (compressed) identifier of the node that the sender (see field number 3) received the packet from |
| 5 | Target receiver | 16 | Hash | The (compressed) identifier of the node for which this packet is intended, or 0xFFF (which means intended for anyone who receives it) |
| 6 | Sender cost to destination | 8 | uint 0-255 | The estimated "cost" by the sender to the destination (the id of the destination is present in the application or transport header) |
| 7 | Sender cost from source | 8 | uint 0-255 | The accumulated "cost" along the path travelled by the packet from the source to the current node |
| 8 | Time to live | 8 | uint 0-255 | The number of hops that the packet is allowed to travel from this node onwards. TTL decremented by every transit node and packet dropped if TTL = 0 |

Gradient Establishment

Every data packet that is received by the node, whether or not it is a duplicate, is passed to the Gradient Establishment (GE) module for processing. (Note that freshness if packets is material, and therefore identical packets received at different times convey some useful distinct information). The GE module maintains the following data structure for every known destination:

Destination. The compressed destination identifier.
Neighbor. The compressed identifier of the (neighbor) node for which this entry is applicable.
Cost. The cost (e.g. hops) of sending a packet to the destination through this neighbor.
Timestamp. When this entry was created.

This information provides information to define "As of timestamp I can get to destination via neighbor subject to cost".

The cost semantics are similar to that in the header. In a preferred embodiment, the number of hops may be used as the cost, and in the discussion below, "hops" and "cost" are tion latency, interference with other communications, security, privacy or other factors may be key, or a part of, the cost function.

A list of entries may be maintained, that is sorted based on the cost. For a given destination and neighbor pair, only one entry is preferably maintained, namely the lowest cost entry. Of course, sorting and filtering the list is not required, and therefore a node may maintain additional information beyond that minimally required.

There is potentially a Gradient State Entry (GSE) for every combination of neighbor and destination. However, in order to limit firmware memory consumption, only a configured maximum number of entries per destination are maintained. Based on simulations, maintaining three entries is sufficient in most cases.

Upon receiving a packet, the GE module inspects the NL header and creates the following entries as long as they are not duplicates, and as long as the entry is not superseded by an existing entry on account of the cost (note that only the least cost entry is maintained for each neighbor). The fields below are from the NL header, except "Now", which refers to the current time at the node.

1. An entry (sender, sender, 1, Now), that reflects that the sender is 1 hop away via the sender (directly reachable).
2. An entry (previous-sender, sender, 2, Now), that reflects that the previous sender is 2 hops away via the sender of the packet, provided the previousSender is not NULL (this is the case if the packet originated at the sender).
3. An entry (source, sender, senderHopsFromSource+1, Now), that reflects that the source is one hop more than the hops from the sender to the source that is conveyed in the header. This entry is made unless the source is either the sender or the previous-sender (because this would duplicate #1 or #2), or the previous-sender is the current node itself (this is because the cost is bound to be higher).

When a packet is flooded through the network, as is the case when there is no state or expired state, a node typically learns the state for all of its 1-hop and 2-hop neighbors. For some operational contexts, this may represent a large fraction of total nodes. Further, for every packet from a distant source, we have state that allows routing along a path to the source.

An example of Gradient Establishment during a Full Flood is illustrated in FIGS. 1A-1C, which shows that a packet is sourced at E, intended for F. Initially there is no state at any node, so the packet is essentially flooded (see below). The relevant header fields senderCostFromSrc (srcH), previous-sender (prevS) and sender (Sendr) are shown corresponding to the transmission. The source field is always E and not shown.

During this flood, the state is created as illustrated by the tables beneath each of FIGS. 1A, 1B and 1C, shows the state created after the transmission of the respective packets per the respective network diagram. Only the state corresponding to nodes B, D and F are shown. For each of these, the hops to the destination is updated based on the received packet.

Each entry in the table shows the number of hops at that node (column) to the destination (row) along with the neighbor through which the specified hops is achievable. Thus, for example, the entry in the last table for F (column), for destination E (row) is 3-C. This means that F infers that it can reach E in 3 hops via node C. The entries are updated according to the algorithm (steps 1-3) above.

Sender Controlled Relaying (SCR)

The SCR module coordinates with peer SCR modules and local GE modules to deliver packets of type private or end-to-end ack to their end destinations. SCR uses the gradient state set up by the GE module to retrieve the "best" next-hop relay neighbor and have the packet be relayed by that neighbor. When there is no state, all nodes relay. SCR uses "eavesdropping", or Implicit Acknowledgements (IA). After transmitting, a node checks, for any packet it expects to be relayed by a specific neighbor, if it was relayed by that neighbor within a timeout period, and if not, retransmits the packet a specified number of times.

The SCR module may receive the packet from the Transport Layer (TL) if the packet was originated at this node, or from the MAC layer if the packet was originated at a different node. In the description below, C denotes the current node.

Upon receiving a packet of type private or E2E Ack from the TL, the SCR module appends an NL header with the version field to current version, sender as C, previousSender as NULL, senderHopsFromSource as 0, and TTL as the configured maximum hops a packet is allowed to travel. The targetReceiver field is set. The isFullFlood and senderHopsToDestination are unused in SCR. It then sends the packet to the MAC Layer and sets an Implicit Acknowledgment (IA) timer.

Upon receiving a packet of type private or E2E Ack from the MAC Layer (ML), the SCR module first processes the packet for IA. It then checks if the destination of the packet is C. If so, it delivers the packet to the TL and terminates processing this packet. Otherwise, it checks if the targetReceiver field is C which implies that this node was chosen for relaying.

If so, then it proceeds to re-transmit the packet provided the TTL is at least 1 and the packet has not been transmitted previously. As in ECHO (see, U.S. Patent Application 62/628,717, filed Feb. 9, 2018, expressly incorporated herein by reference in its entirety), the seqNum field can be used to determine whether the packet was previously received and re-transmitted. The SCR module modifies the NL header setting the sender as C, copies the sender field from the header into the previousSender field, updates the senderCostFromSource (as discussed above, in this embodiment, cost=hops, so it increments the field), and decrements the TTL. Finally, it sets the targetReceiver field. It then sends the packet to the MAC Layer and sets an IA timer.

Figure 2:
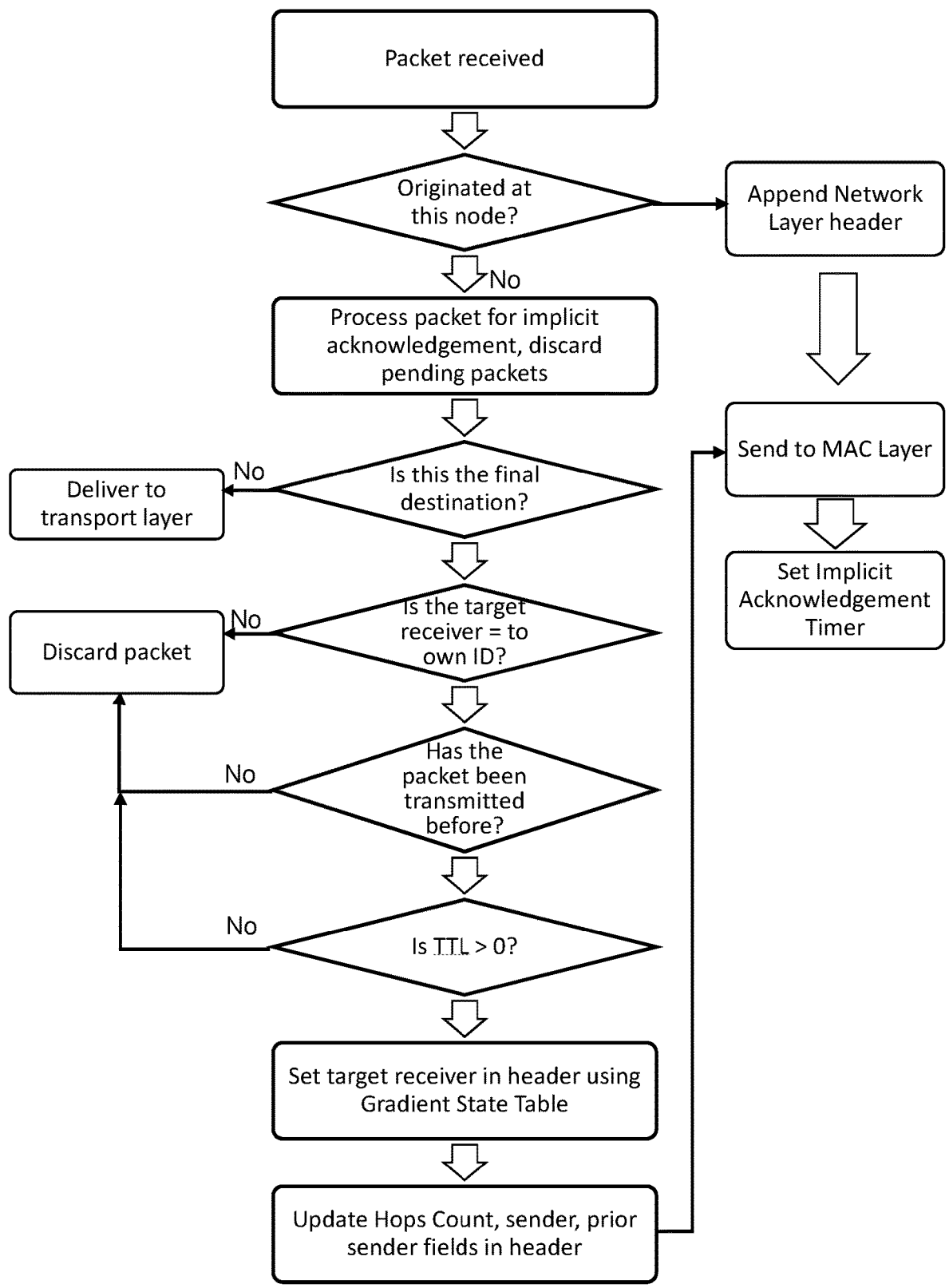
FIG. 2 shows a flow diagram of a Sender Controlled Relaying (SCR) process.

FIG. 2 shows a flow chart for the initial packet sending in SCR (not retransmission).

Choosing a Target Receiver

There are many heuristics possible for choosing the target receiver. According to a preferred embodiment, the target receiver is chosen as follows. Let the destination ID be D. For each destination, we maintain a few Gradient State Entries (GSEs) per neighbor. The neighbor is picked such that the cost field is the lowest among all entries for the destination, with ties broken randomly, provided the timestamp field of the entry is not less than the current time minus a configured parameter GSE_EXPIRY_PERIOD.

In case of retransmissions, SCR attempts to choose the target neighbor that is different from those for previous retransmissions, if one exists, provided that target neighbor has the same or less cost to the destination. If such a fresh target neighbor is not available, previously chosen target neighbor is returned. Note that in some implementations, a failed transmission is an indicator of higher cost, and therefore the cost for use of that same path increased for future use. Thus, the cost may be used to provide implicit control over communication route preferences, and need not be based solely on hop count or objective or unbiased criteria.

If there is no entry for D, or if the entry is not fresh enough, SCR transmits the packet with the targetReceiver field set to NULL, indicating that any node that receives the packet should forward it provided it hasn't already done so.

Implicit Acknowledgements and Retransmission

SCR uses overheard packets from the target receiver as an implicit acknowledgement of delivery. After transmitting a packet that has a non-NULL target receiver, SCR sets an IA-Timer for the packet and stores the packet for retransmission, unless the target receiver is the final destination in which case no timer is set.

All received packets from the target receiver are processed to check if the packet identifier matches that of a stored packet. If so, the packet is deleted from the store, and the IA-timer is cancelled. Further, if an End-to-End Acknowledgement for the data packet is received, then the IA-timer is cancelled as well, since this implies that the data packet has been delivered. The network layer (NL) may process/inspect a Transport Layer (TL) header to accomplish this. This cross-layer inspection may violate layer distinctions, however, it helps improve performance, and such layer boundaries are heuristics and not prohibitions.

If no IA is obtained, then the IA-timer will trigger an interrupt, upon which the packet is retransmitted as long as the total number of retransmissions of the packet does not exceed a configured parameter SCR_MAX_XMTS. The Gradient State Table is consulted afresh to update the targetReceiver field so that any most up to date gradient information can be utilized.

If the number of transmissions has exceeded SCR_MAX_XMTS, then a flood is initiated on the packet. Specifically, the packet is sent with the targetReceiver field set to NULL, indicating that any node that receives the packet should forward it provided it hasn't already done so.

Therefore, by implicitly monitoring headers of packets that include constructive data communication payloads, a reactive routing protocol can reliably operate without requiring communication of any explicit control packets.

In some cases, out of band communications may be used to populate a routing table. For example, in a MANET employing nodes that have unreliable or interrupted cellular connectivity (or another type of communication network) and an alternate physical layer communication link, the routing information for the alternate physical layer communication link may be distributed to other nodes, and received from other nodes, when the cellular connectivity is available, so that when this connectivity becomes unavailable, reasonably fresh network state information is available without flooding of the alternate physical layer communication link.

Figure 3:
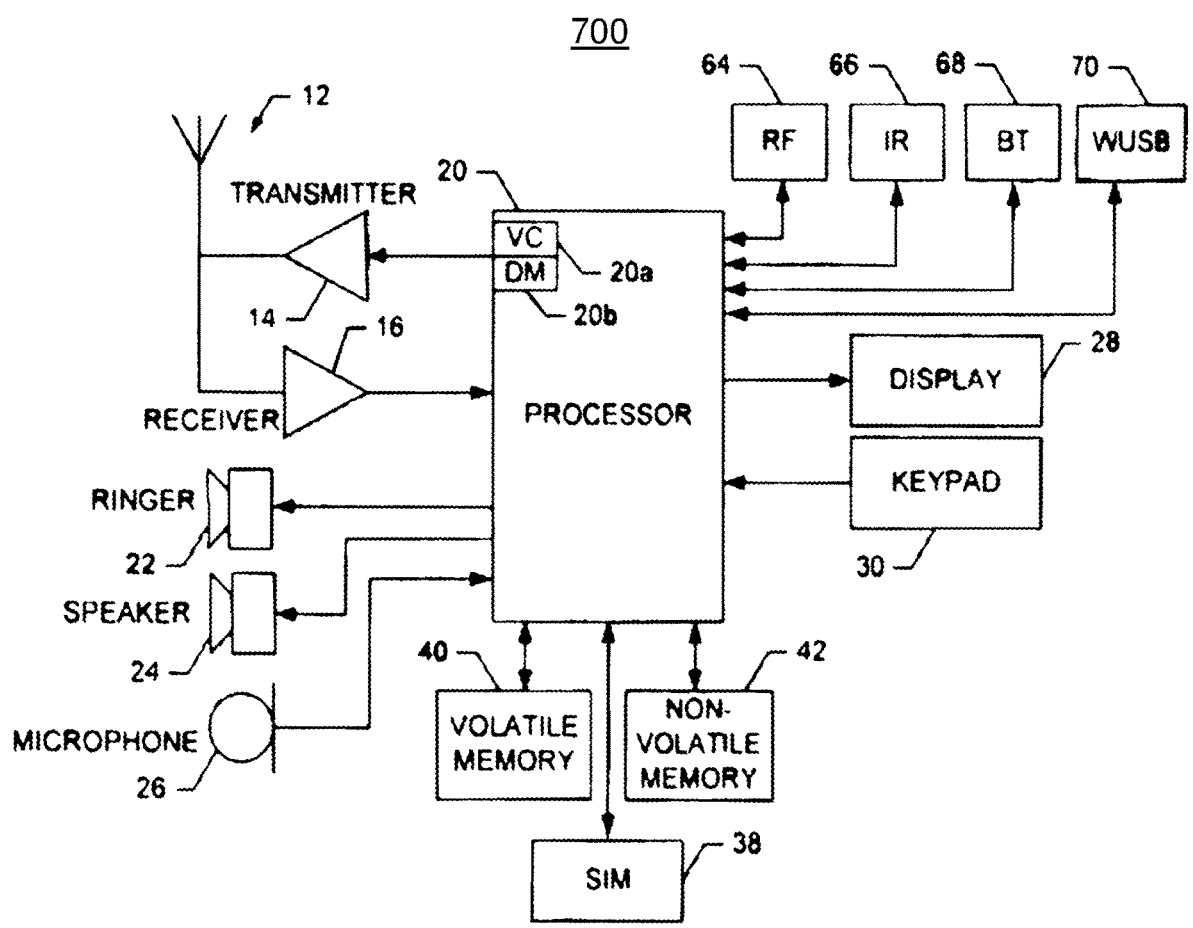
FIG. 3 shows an exemplary hardware Architecture.

FIG. 3 depicts an example of an apparatus 700, in accordance with some example embodiments. This is similar to FIG. 7 of U.S. 20170332439. The apparatus 700 may comprise a node. Moreover, the nodes may comprise a user equipment, such as an internet of things device (for example, a machine, a sensor, an actuator, and/or the like), a smart phone, a cell phone, a wearable radio device (for example, an Internet of things [IoT] fitness sensor or other type of IoT device), and/or any other radio based device.

In some example embodiments, apparatus 700 may also include a radio communication link to a cellular network, or other wireless network. The apparatus 700 may include at least one antenna 12 in communication with a transmitter 14 and a receiver 16. Alternatively transmit and receive antennas may be separate.

The apparatus 700 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 700 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 700 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with a mesh network protocol, as discussed above, may employ number of different wireline or wireless networking techniques.

The apparatus 700 may also be capable of operating with one or more air interface standards, communication protocols, modulation types, access types, and/or the like, though these may require separate radios and/or a software defined radio implementation to permit these alternate uses. The preferred implementation is a 900 MHz radio operating in the 928 MHz ISM band, and complying with F.C.C. regulations for unlicensed use. The data carrier over the radio may include TCP/IP packets, UDP packets, or other standard higher level protocols.

It is understood that the processor 20 may include circuitry for implementing audio/video and logic functions of apparatus 700. For example, the processor 20 may comprise a digital signal processor device, a microprocessor device, an analog-to-digital converter, a digital-to-analog converter, and/or the like. Control and signal processing functions of the apparatus 700 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 700 to perform actions. For example, processor 20 may be capable of operating a connectivity program, such as, a web browser. The connectivity program may allow the apparatus 700 to transmit and receive web content, such as location-based content, according to a protocol, such as, wireless application protocol, wireless access point, hypertext transfer protocol, HTTP, and/or the like.

Apparatus 700 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 700 may include a battery for powering various circuits related to the mobile terminal, for example, a circuit to provide mechanical vibration as a detectable output. The user input interface may comprise devices allowing the apparatus 700 to receive data, such as, a keypad 30 (which can be a virtual keyboard presented on display 28 or an externally coupled keyboard) and/or other input devices. Preferably, the device is a low data rate, non-real time communication device, i.e., unsuitable for real-time voice communications, but this is not a limitation of the technology per se.

The apparatus 700 preferably also includes a short-range radio frequency (RF) transceiver and/or interrogator 64, so data may be shared with and/or obtained from electronic devices in accordance with RF techniques. The apparatus 700 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, Bluetooth Low-Energy, and other radio standards, such as Bluetooth 4.0. In this regard, the apparatus 700 and, in particular, the short-range transceiver may be capable of transmitting data to and/or receiving data from electronic devices within a proximity of the apparatus, such as within 100 meters. The apparatus 700 including the Wi-Fi (e.g., IEEE-802.11ac, ad, ax, af, ah, az, ba, a, b, g, i, n, s, 2012, 2016, etc.) or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 700 may comprise memory, such as, a subscriber identity module (SIM) 38 (for use in conjunction with a cellular network), a removable user identity module (R-UIM), and/or the like, which may store information elements related to a mobile subscriber. In addition to the SIM, the apparatus 700 may include other removable and/or fixed memory. The apparatus 700 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, solid state drive, magnetic storage devices, optical disc drives, ferroelectric RAM, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the nodes disclosed herein. The memories may comprise an identifier, such as an international mobile equipment identification (IMEI) code, capable of uniquely identifying apparatus 700. The functions may include one or more of the operations disclosed herein including with respect to the nodes and/or routers disclosed herein (see for example, 300, 400, 500, and/or 600). In the example embodiment, the processor 20 may be configured using computer code stored at memory 40 and/or 42 to provide the operations, such as detecting, by a router coupling a first mesh network to at least one other mesh network, a mesh packet having a destination node in the at least one other mesh network; receiving, at the router, an internet protocol address of the at least one other router, wherein the internet protocol address is received in response to querying for the destination node; and sending, by the router, the mesh packet encapsulated with the internet protocol address of the at least one other router coupled to the at least one other mesh network including the destination node.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed with respect to the nodes disclosed herein.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and sub-combinations of the disclosed features and/or combinations and sub-combinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A mesh network communication protocol method for communicating between a plurality of respective mesh network nodes, comprising communications from a prior sender to a current sender, from the current sender to at least one respective recipient, repeated as required to reach to a final destination, the method comprising:
receiving a data packet from a current sender by a respective recipient, the data packet defining: an identity of the current sender, an identity of the prior sender from which the current sender received the data packet, a hop count of hops previously traversed by the data packet, an identity of a target recipient, an identity of the final destination, and a sequence identifier;
updating a forwarding table to mark the current sender as being reachable in one hop, and the prior sender as being reachable in two hops via the current sender as next hop;
determining whether to rebroadcast by the respective recipient, if and only if the sequence identifier is not present in a list of prior sequence identifiers, the identity of the target recipient matches an identity of the respective recipient, and the identity of the final destination is not the identity of the respective recipient; and
selectively rebroadcasting the data packet by the respective recipient in dependence on said determining, modified by: a replacement of the identity of the current sender with the identity of the respective recipient, a replacement of the identity of the prior sender with the identity of the current sender, a replacement of the identity of the target recipient with an identity of another recipient as a next hop from the forwarding table if present, and an increment of the hop count.

2. The protocol according to claim 1, further comprising updating the forwarding table to mark an originator of the data packet as being reachable in one plus the hop count, via the current sender as the next hop.

3. The protocol according to claim 1, wherein a time at which the data packet was received from the current sender by the respective recipient is stored in the forwarding table as a timestamp.

4. The protocol according to claim 3, wherein said selectively rebroadcasting by the respective recipient is further dependent on an elapsed time with respect to the timestamp.

5. The protocol according to claim 1, wherein said selectively rebroadcasting by the respective recipient is further dependent on whether the next hop is present in the forwarding table.

6. The protocol according to claim 1, wherein the data packet contains a time-to-live that is decremented by the respective recipient.

7. The protocol according to claim 6, further comprising, in conjunction with rebroadcasting, if the time-to-live after decrementing is at least one, setting a timer by the respective recipient for acknowledgement, and monitoring by the respective recipient subsequent receipt of an overheard data packet having the sequence identifier, and if the overheard packet having the sequence identifier is not received before expiry of the timer, rebroadcasting the modified data packet by the respective recipient.

8. The protocol according to claim 6, further comprising, in conjunction with rebroadcasting, if the time-to-live after decrementing is at least one, setting a timer by the respective recipient for acknowledgement, and monitoring by the respective recipient subsequent receipt of an overheard data packet having the sequence identifier, and if the overheard packet having the sequence identifier is not received before expiry of the timer, selectively rebroadcasting the data packet by the respective recipient in dependence on said determining, modified by: a replacement of the identity of the current sender with the identity of the respective recipient, a replacement of the identity of the prior sender with the identity of the current sender, a replacement of the identity of the target recipient with an identity of an alternate next hop from the forwarding table if present, and an increment of the hop count.

9. A mesh network communication node, configured for communication with other mesh network nodes comprising senders which transmits data packets to the mesh network communication node, and recipients that receive packets from the mesh network communication node, comprising:
a memory configured to store an identifier of the mesh network communication node and a forwarding table;
a radio frequency transceiver configured to receive a data packet from a current sender, the data packet defining: an identity of the current sender, an identity of a prior sender from which the current sender received the data packet, an identity of a final destination for the data packet, a hop count of hops previously traversed by the data packet, an identity of a target recipient, and a sequence identifier;
at least one processor configured to:
update the forwarding table to mark the current sender as being reachable in one hop, and the prior sender as being reachable in two hops via the current sender as next hop;
determine whether to rebroadcast the data packet, if and only if the sequence identifier is not present in a list of prior sequence identifiers and the identity of the final destination is not the identifier of the mesh network communication node;
modify the data packet by: a replacement of the identity of the current sender with the identity of the mesh network communication node, a replacement of the identity of the prior sender with the identity of the current sender, a replacement of the identity of the target recipient with an identity of a next hop from the forwarding table if present, and an increment of the hop count; and
selectively control a rebroadcast of the modified data packet through the radio frequency transceiver, in dependence on the determination.

10. The mesh network communication node according to claim 9, wherein the at least one processor is further configured to update the forwarding table to mark the originator of the data packet as being reachable in one plus the hop count, via the current sender as the next hop.

11. The mesh network communication node according to claim 9, wherein the at least one processor is further configured to store a timestamp representing a time that the data packet is received in the forwarding table.

12. The mesh network communication node according to claim 11, wherein the at least one processor is further configured to determine an expiry of a timer with respect to the stored timestamp.

13. The mesh network communication node according to claim 9, wherein the selective control of the rebroadcast is further dependent on whether the next hop is present in the forwarding table.

14. The mesh network communication node according to claim 9, wherein the data packet contains a time-to-live, and the at least one processor is further configured to decrement the time-to-live.

49

15. The mesh network communication node according to claim 14, wherein the at least one processor is further configured to selectively control the rebroadcast of the modified data packet through the radio frequency transceiver further in dependence on whether the time-to-live has reached zero.

16. The mesh network communication node according to claim 14, wherein the at least one processor is further configured to, in conjunction with selectively controlling the rebroadcasting, if the time-to-live after decrementing is at least one, set a timer for acknowledgement, and monitor subsequent receipt of an overheard data packet having the sequence identifier, and if the overheard packet having the sequence identifier is not received before expiry of the timer, selectively control the rebroadcast of the modified data packet.

17. The mesh network communication node according to claim 14, wherein the at least one processor is further configured to, in conjunction with selectively controlling the rebroadcasting, if the time-to-live after decrementing is at least one, selectively control of a further rebroadcast of a second modified data packet, modified by: a replacement of the identity of the current sender with an identity of the mesh network communication node, a replacement of the identity of the prior sender with the identity of the current sender, a replacement of the identity of the target recipient with an identity of an alternate next hop from the forwarding table if present, and an increment of the hop count.

18. A computer readable non-transitory memory storing instructions for controlling a programmable processor to implement a mesh network communication protocol for controlling communications between respective mesh network nodes from a prior sender to a current sender, from the current sender to at least one respective recipient, repeated as required to reach to a final destination, comprising:
  instructions for receiving a data packet from a current sender by a respective recipient, the data packet defining: an identity of the current sender, an identity of the prior sender from which the current sender received the data packet, a hop count of hops previously traversed by the data packet, an identity of a target recipient, an identity of the final destination, and a sequence identifier;
  instructions for updating a forwarding table to mark the current sender as being reachable in one hop, and the prior sender as being reachable in two hops via the current sender as next hop;
  instructions for determining whether to rebroadcast by the respective recipient, if and only if the sequence identifier is not present in a list of prior sequence identifiers and the identity of the final destination is not an identity of the respective recipient; and
  instructions for selectively rebroadcasting the data packet by the respective recipient in dependence on said determining, modified by: a replacement of the identity of the current sender with the identity of the respective recipient, a replacement of the identity of the prior sender with the identity of the current sender, a replacement of the identity of the target recipient with an identity of a next hop from the forwarding table if present, and an increment of the hop count.

19. The computer readable non-transitory memory according to claim 18, further comprising instructions for updating the forwarding table to mark the originator of the data packet as being reachable in one plus the hop count, via the current sender as the next hop.

50

20. The computer readable non-transitory memory according to claim 18, wherein a time of receipt of the data from the current sender defines a timestamp, further comprising instructions for storing the timestamp in the forwarding table.

21. The computer readable non-transitory memory according to claim 20, further comprising instructions for selectively rebroadcasting further dependent on whether a predetermined time has elapsed with respect to the timestamp.

22. The computer readable non-transitory memory according to claim 18, wherein the instructions for rebroadcasting comprise instructions for contingent execution dependent on whether the next hop is present in the forwarding table.

23. The computer readable non-transitory memory according to claim 18, wherein the data packet contains a time-to-live, further comprising instructions for decrementing the time-to-live.

24. The computer readable non-transitory memory according to claim 23, further comprising instructions for, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, rebroadcasting the modified data packet.

25. The computer readable non-transitory memory according to claim 23, further comprising instructions for, in conjunction with rebroadcasting, if the time-to-live after decrementing is at least one, setting a timer for acknowledgement, and monitoring subsequent receipt of an overheard data packet having the sequence identifier, and if the overheard packet having the sequence identifier is not received before expiry of the timer, selectively rebroadcasting the data packet in dependence on said determining, modified by: a replacement of the identity of the current sender with the identity of the respective recipient, a replacement of the identity of the prior sender with the identity of the current sender, a replacement of the identity of the target recipient with an identity of an alternate next hop from the forwarding table if present, and an increment of the hop count.

26. A method of operating a node of a mesh network having a node identifier, which is adapted to receive a data packet from a current sender and transmit the data packet to a recipient, comprising:
  receiving the data packet, the data packet defining:
    an identity of the current sender,
    an identity of a prior sender from which the current sender received the data packet,
    an identity of a target recipient, and
    a sequence identifier;
  updating a forwarding table to mark the current sender as being reachable in one hop, and the prior sender as being reachable in two hops via the current sender as next hop;
  determining whether to rebroadcast data contained in the data packet, based on at least whether:
    the sequence identifier is present in a list of prior sequence identifiers, and
    the identity of the target recipient matches the node identifier; and
  selectively rebroadcasting a modified data packet in dependence on said determining, modified by:

a replacement of the identity of the current sender with the node identifier, a replacement of the identity of the prior sender with the identity of the current sender, and a replacement of the identity of the target recipient with an identity of a next hop from the forwarding table if present.

27. The method according to claim 26, wherein:

the data packet comprises data and a packet header which further defines:

a hop count of hops previously traversed by the data packet; and an identity of a final destination;

said determining comprises determining whether to rebroadcast data contained in the data packet, if and only if:

the sequence identifier is not present in a list of prior sequence identifiers, the identity of the target recipient matches the node identifier, and the identity of the final destination is not the node identifier; and said selectively rebroadcasting comprises selectively rebroadcasting the data of the data packet having the packet header further modified from the packet header of the data packet by an increment of the hop count.

* * * * *